(12) United States Patent
Renold et al.

(10) Patent No.: US 10,882,410 B2
(45) Date of Patent: Jan. 5, 2021

(54) SYSTEMS FOR CHARGING AERIAL VEHICLES

(71) Applicant: Wing Aviation LLC, Mountain View, CA (US)

(72) Inventors: Nick Renold, Mountain View, CA (US); Matthew Nubbe, Mountain View, CA (US); Jim Schmalzried, Mountain View, CA (US); Jesse Blake, Mountain View, CA (US); Scott Velez, Mountain View, CA (US); Dustin Sanders, Mountain View, CA (US); Stephen Benson, Mountain View, CA (US); Evan Twyford, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 555 days.

(21) Appl. No.: 15/654,644

(22) Filed: Jul. 19, 2017

(65) Prior Publication Data

US 2019/0023133 A1 Jan. 24, 2019

(51) Int. Cl.
*B60L 53/30* (2019.01)
*B64C 1/00* (2006.01)
*B60L 53/35* (2019.01)
*B60L 53/16* (2019.01)
*B60L 53/12* (2019.01)
(Continued)

(52) U.S. Cl.
CPC ............... *B60L 53/30* (2019.02); *B60L 53/12* (2019.02); *B60L 53/16* (2019.02); *B60L 53/35* (2019.02); *B64C 1/00* (2013.01); *B64C 39/024* (2013.01); *B64F 1/007* (2013.01); *B64F 1/02* (2013.01); *H02J 7/0044* (2013.01); *B60L 2200/10* (2013.01); *B64C 2201/042* (2013.01); *B64C 2201/066* (2013.01)

(58) Field of Classification Search
CPC ... H02J 7/0027; H02J 7/0044; B60L 11/1809; B60L 11/182; B60L 53/12; B60L 53/16; B60L 53/30; B60L 53/35; B60L 53/80; B64C 27/08; B64C 2201/066
USPC .................. 320/109, 114, 115; 244/58, 17.23
See application file for complete search history.

(56) References Cited

U.S. PATENT DOCUMENTS

2009/0278494 A1    11/2009  Randall
2015/0183326 A1*   7/2015   Ryberg .................. B60L 53/80
                                                    320/109
(Continued)

FOREIGN PATENT DOCUMENTS

CN            202929383 U        5/2013

*Primary Examiner* — Edward Tso
*Assistant Examiner* — Aaron Piggush
(74) *Attorney, Agent, or Firm* — McDonnell Boehnen Hulbert & Berghoff LLP

(57) ABSTRACT

An example embodiment includes a landing pad having a housing and a power terminal configured to draw electric power from a power source. The landing pad further includes an electrically conductive landing terminal dorsal to the housing and configured such that, during a landing state of an aerial vehicle, the landing terminal makes contact with a plurality of electric contacts disposed ventrally to a fuselage of the aerial vehicle. The landing terminal is configured to transfer electric power drawn by the power terminal to the aerial vehicle via the electric contacts during the landing state of the aerial vehicle.

25 Claims, 25 Drawing Sheets

(51) Int. Cl.
    *H02J 7/00*         (2006.01)
    *B64C 39/02*      (2006.01)
    *B64F 1/00*        (2006.01)
    *B64F 1/02*        (2006.01)

(56) References Cited

U.S. PATENT DOCUMENTS

| | | | |
|---|---|---|---|
| 2016/0001883 A1* | 1/2016 | Sanz | H02J 7/0042 244/17.23 |
| 2016/0196756 A1* | 7/2016 | Prakash | B64C 39/024 701/3 |

* cited by examiner

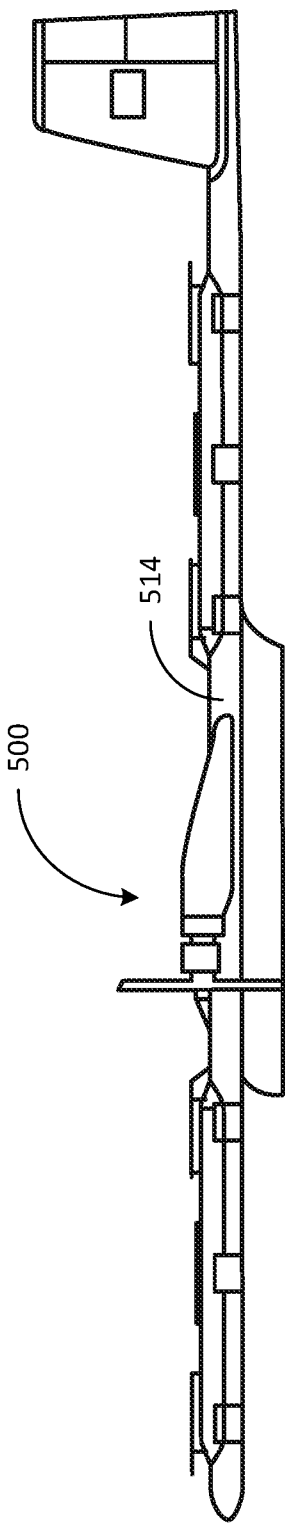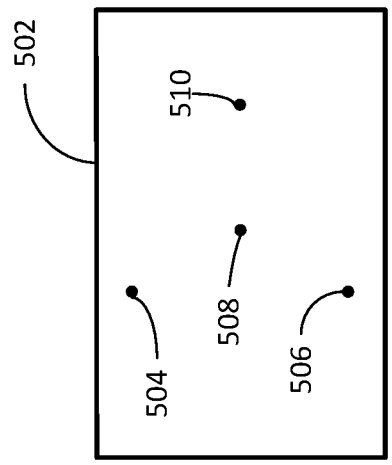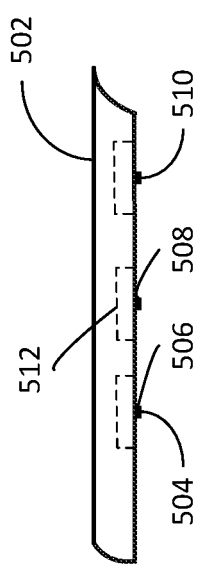
FIG. 5A
FIG. 5B
FIG. 5C

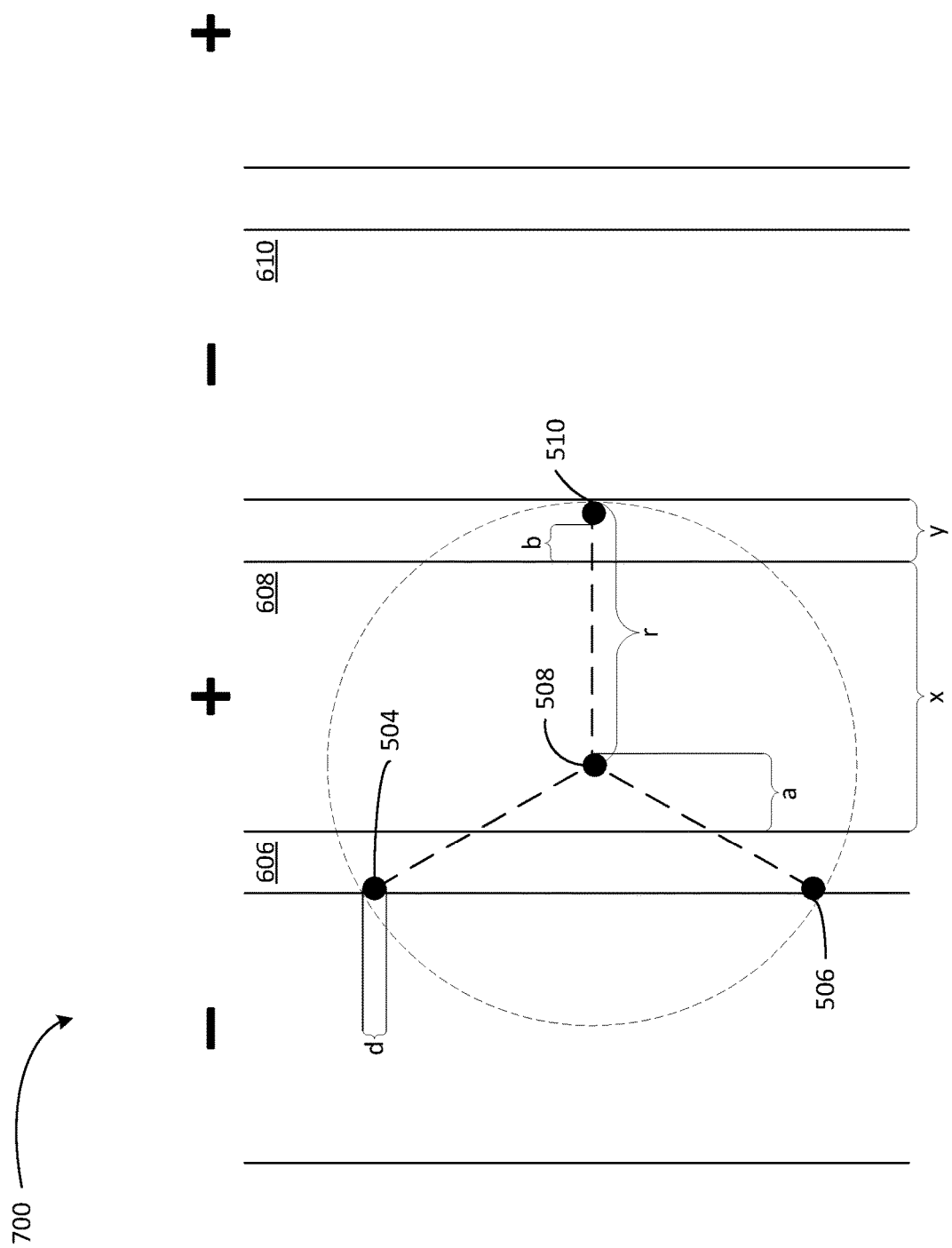

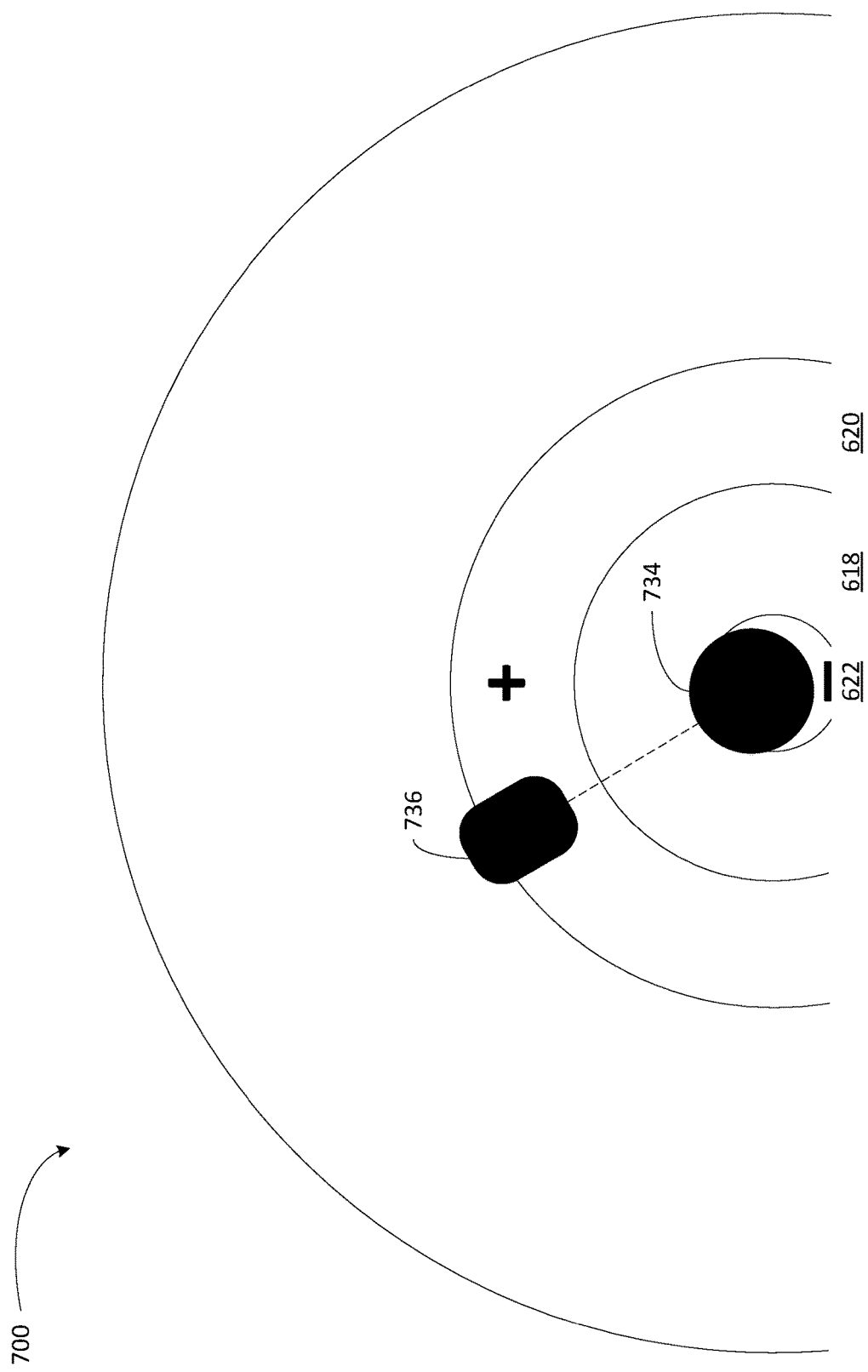

SYSTEMS FOR CHARGING AERIAL VEHICLES

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned systems exist for operation in the air, on the ground, underwater, and in space. Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example systems and methods may relate to charging of aerial vehicles via a landing pad. The aerial vehicle may include electric contacts disposed ventrally to a fuselage of the aerial vehicle. The electric contacts may be configured to receive electric power from the landing pad during a landing state of the aerial vehicle. The aerial vehicle may also include a power sink configured to receive electric power received by the electric contacts. During the landing state, the electric contacts may contact an electrically conductive landing terminal of the landing pad. The landing terminal may draw electric power from a power source for consumption by the power sink of the aerial vehicle.

In one example, an aerial vehicle is provided that includes a fuselage, and a power sink. The aerial vehicle also includes a charging terminal ventral to the fuselage. The charging terminal includes a plurality of electric contacts configured such that, during a landing state of the aerial vehicle, the electric contacts make contact with an electrically conductive landing terminal associated with a landing pad. The electric contacts are configured to draw electric power from the landing pad via the landing terminal. The aerial vehicle further includes a plurality of electric leads configured to transfer the electric power drawn from the landing pad by the plurality of electric contacts to the power sink.

In another example, a system is provided that includes an aerial vehicle. The aerial vehicle includes a fuselage, a power sink, and a charging terminal ventral to the fuselage. The charging terminal includes a plurality of electric contact. The system also includes a landing pad. The landing pad includes housing, and an electrically conductive landing terminal dorsal to the housing. The electric contacts of the aerial vehicle and the electrically conductive landing terminal of the landing pad are configured such that, during a landing state of the aerial vehicle, the electric contacts make contact with the landing terminal, and the landing terminal is configured to transfer electric power to the aerial vehicle via the electric contacts.

In another example, a circuit is provided that includes a plurality of electric contacts disposed on a bottom side of an aerial vehicle. The circuit also includes a power sink included within the aerial vehicle. The power sink is configured to receive electric power from the electric contacts. The circuit further includes a plurality of nodes disposed on a top side of an electrically conductive landing terminal associated with a landing pad, and a power source associated with the landing pad. The power source is configured to transfer electric power to the nodes disposed on the electrically conductive landing terminal. During a non-landing state of the aerial vehicle, the electric contacts of the aerial vehicle are not in contact with the nodes of the landing pad such that the circuit is open. During a landing state of the aerial vehicle, the electric contacts of the aerial vehicle are in contact with the nodes of the landing pad such that the circuit is closed, and the electric contacts draw electric power from the nodes for consumption by the power sink of the aerial vehicle.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 5A is a side view of an aerial vehicle, according to an example embodiment.

FIG. 5B is a side view of a charging terminal of an aerial vehicle, according to an example embodiment.

FIG. 5C is a bottom view of a charging terminal of an aerial vehicle, according to an example embodiment.

FIG. 7A is a simplified illustration of a charging terminal making contact with a landing terminal, according to an example embodiment.

FIG. 7E is a simplified illustration of a charging terminal making contact with a landing terminal, according to another example embodiment.

DETAILED DESCRIPTION

Figure 1A:
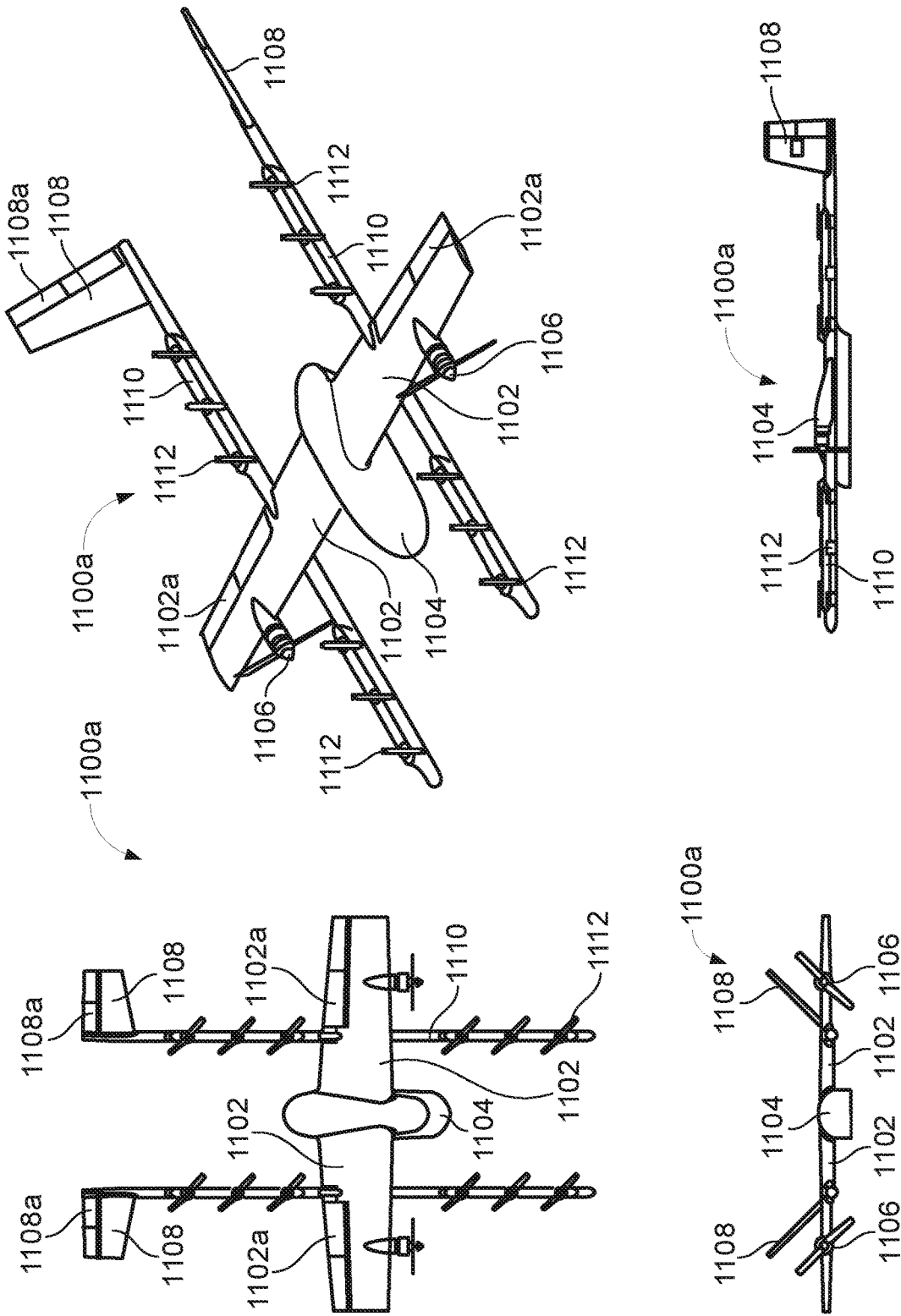
FIG. 1A is a simplified illustration of an unmanned aerial vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example embodiments may include or otherwise relate to systems for charging an aerial vehicle. In particular, example embodiments may relate to landing pads and aerial vehicles configured such that, once an aerial vehicle lands on a landing pad, the landing pad transmits electric power to the aerial vehicle via a landing surface of the landing pad.

An aerial vehicle may have a charging terminal disposed ventrally to a fuselage of the aerial vehicle. For example, the aerial vehicle may have a landing mechanism such as a foot or feet that are configured to receive electric power from an electrically conductive surface. The landing mechanism may include the charging terminal, which may include electric contacts.

A landing pad may include an electrically conductive landing terminal disposed dorsally to the landing pad. The landing terminal may include a plurality of nodes arranged such that, once the aerial vehicle lands, the nodes transfer electric power to the aerial vehicle via the charging terminal of the aerial vehicle regardless of a pose of the charging terminal relative to the landing terminal. Arranging the nodes of the landing pad in this fashion may allow an aerial vehicle to begin charging immediately upon landing without need for a plug or manual interaction with the aerial vehicle. Further, arranging the electric contacts of the aerial vehicle and the nodes of the landing pad in this fashion may allow an aerial vehicle to approach the landing pad from any direction or in turbulent conditions while still allowing the aerial vehicle to charge.

In some examples, the nodes may be arranged in alternating positive and negative strips having non-conducting gaps disposed between the strips. The non-conductive gaps may be wider than a diameter of the electric contacts of the aerial vehicle. In this fashion, the landing terminal may prevent the electric contacts from shorting a circuit associated with the aerial vehicle and the landing pad. That is, because the gaps are wider than the electric contacts, the contacts may not contact a positive and negative node at the same time. In other examples, the nodes on the landing terminal of the landing pad may be arranged in a checkerboard configuration rather than in alternating strips. Other configurations are possible as well.

The electric contacts may, in turn, be configured to interface with a configuration of the landing pad. For example, where the nodes of the landing terminal are arranged in alternating strips, the charging terminal may include a minimum of four electric contacts to ensure that the charging terminal draws electric power from the landing terminal regardless of a pose of the charging terminal relative to the landing terminal. However, a charging terminal configured to interact with a landing terminal arranged in a checkerboard configuration may include higher number of electric contacts. Further, the electric contacts may be disposed within a radius of a point central to the contacts. For instance an electric contact may be disposed on the central point, and other electric contacts may be oriented radially about the central point and within the radius. The radius may depend on the width of the nodes of the landing terminal or the gaps between the nodes. Allowing for multiple arrangements may allow for certain aerial vehicles to interface with certain landing pads, but not others.

In some examples, the aerial vehicle may navigate to ensure a desired pose of the charging terminal relative to the landing terminal. For instance, the aerial vehicle may navigate such that, during a landing state of the aerial vehicle, a line spanning a given pair of electric contacts aligns substantially perpendicularly to a node of the landing terminal. In such examples, the charging terminal may include as few as two electric contacts.

In some examples, the landing pad may include modular tiled elements. The tiled elements may interact to collectively form the landing terminal. Tiling the landing pad in this fashion may allow for adaptively sized landing pads that may be larger or smaller depending on a type of aerial vehicle that is to be charged or turbulence conditions near the landing terminal. For example, in a turbulent area, more tiled elements may be used to form a large landing pad.

In some examples, the landing pad may include additional features that allow for automatic interfacing between the aerial vehicle and the landing pad. For instance, the landing pad may include a visual indicator or a beacon that allows an aerial vehicle to navigate effectively to the landing terminal of the aerial vehicle. A housing of the aerial vehicle may, for example, include a transceiver that allows the landing pad to communicate with the aerial vehicle.

In additional examples, the landing pad may include a retractable hood that protects the landing terminal from outside elements. When an aerial vehicle approaches, the landing pad may communicate with the aerial vehicle, and the hood may retract to allow the aerial vehicle to land. Once the aerial vehicle has landed, the hood may close to protect the aerial vehicle.

In some examples, the electric contacts of the aerial vehicle and the nodes of the landing terminal may be exposed. As such, the aerial vehicle may include sensors that detect the temperature of its battery. A controller of the landing pad may alter power output accordingly. Further, the aerial vehicle may retract the electric contacts while it is flying to avoid moisture reaching the electric contacts.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. Illustrative Unmanned Vehicles

Herein, the terms "unmanned aerial system" and "UAS" refer to any autonomous or semi-autonomous vehicle that is capable of performing some functions without a physically present human pilot.

A UAS can take various forms. For example, a UAS may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAS.

FIG. 1A is a simplified illustration providing various views of a UAS, according to an example embodiment. In particular, FIG. 1A shows an example of a fixed-wing UAS 1100a, which may also be referred to as an airplane, an aeroplane, a biplane, a glider, or a plane, among other possibilities. The fixed-wing UAS 1100a, as the name implies, has stationary wings 1102 that generate lift based on the wing shape and the vehicle's forward airspeed. For instance, the two wings 1102 may have an airfoil-shaped cross section to produce an aerodynamic force on the UAS 1100a.

As depicted, the fixed-wing UAS 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAS 1100a may also include landing gear (not shown) to assist with controlled take-offs and landings. In other embodiments, other types of UASs without landing gear are also possible.

The UAS 1100a further includes propulsion units 1106 positioned on the wings 1106 (or fuselage), which can each include a motor, shaft, and propeller, for propelling the UAS 1100a. Stabilizers 1108 (or fins) may also be attached to the UAS 1110a to stabilize the UAS's yaw (turn left or right) during flight. In some embodiments, the UAS 1100a may be also be configured to function as a glider. To do so, UAS 1100a may power off its motor, propulsion units, etc., and glide for a period of time. In the UAS 1100a, a pair of rotor supports 1110 extend beneath the wings 1106, and a plurality of rotors 1112 are attached rotor supports 1110. Rotors 1110 may be used during a hover mode wherein the UAS 1110a is descending to a delivery location, or ascending following a delivery. In the example UAS 1100a, stabilizers 1108 are shown attached to the rotor supports 1110.

During flight, the UAS 1100a may control the direction and/or speed of its movement by controlling its pitch, roll, yaw, and/or altitude. For example, the stabilizers 1108 may include one or more rudders 1108a for controlling the UAS's yaw, and the wings 1102 may include one or more elevators for controlling the UAS's pitch and/or one or more ailerons 1102a for controlling the UAS's roll. As another example, increasing or decreasing the speed of all the propellers simultaneously can result in the UAS 1100a increasing or decreasing its altitude, respectively.

Figure 1B:
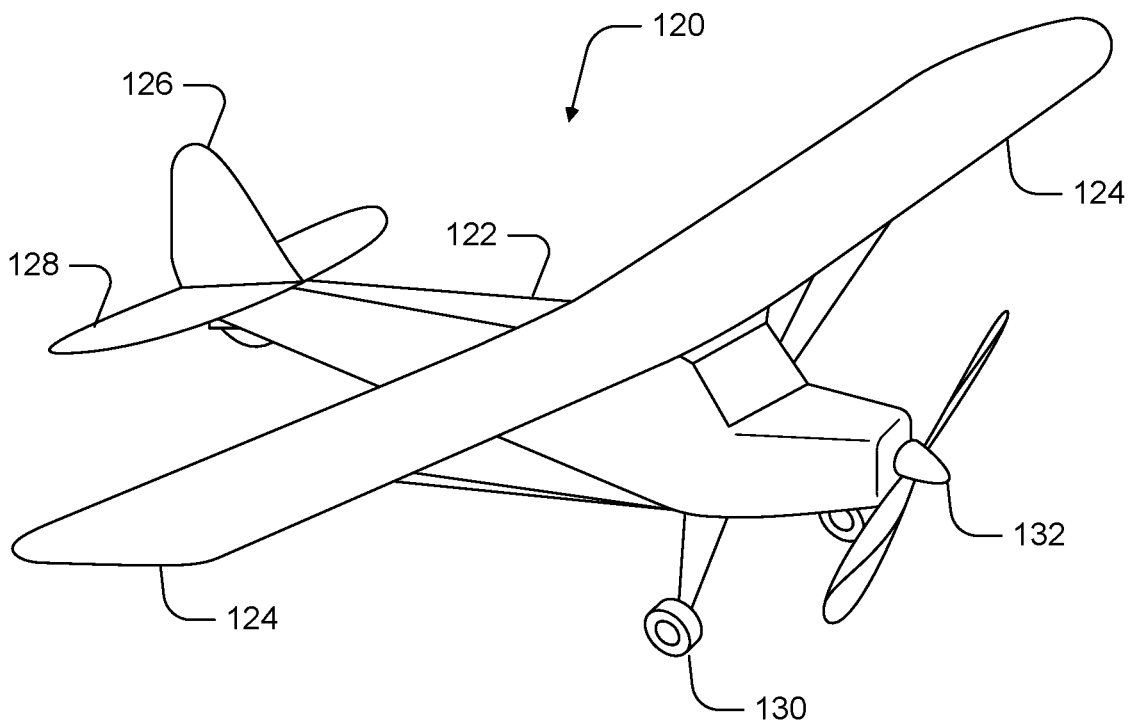
FIG. 1B is a simplified illustration of an unmanned aerial vehicle, according to an example embodiment.

Similarly, FIG. 1B shows another example of a fixed-wing UAS 120. The fixed-wing UAS 120 includes a fuselage 122, two wings 124 with an airfoil-shaped cross section to provide lift for the UAS 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
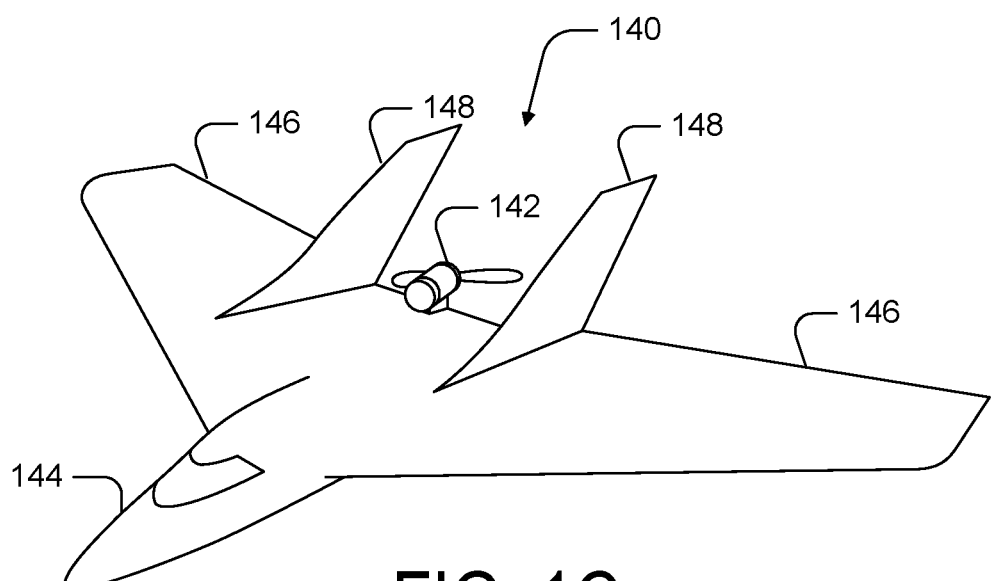
FIG. 1C is a simplified illustration of an unmanned aerial vehicle, according to an example embodiment.

FIG. 1C shows an example of a UAS 140 with a propeller in a pusher configuration. The term "pusher" refers to the fact that a propulsion unit 142 is mounted at the back of the UAS and "pushes" the vehicle forward, in contrast to the propulsion unit being mounted at the front of the UAS. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
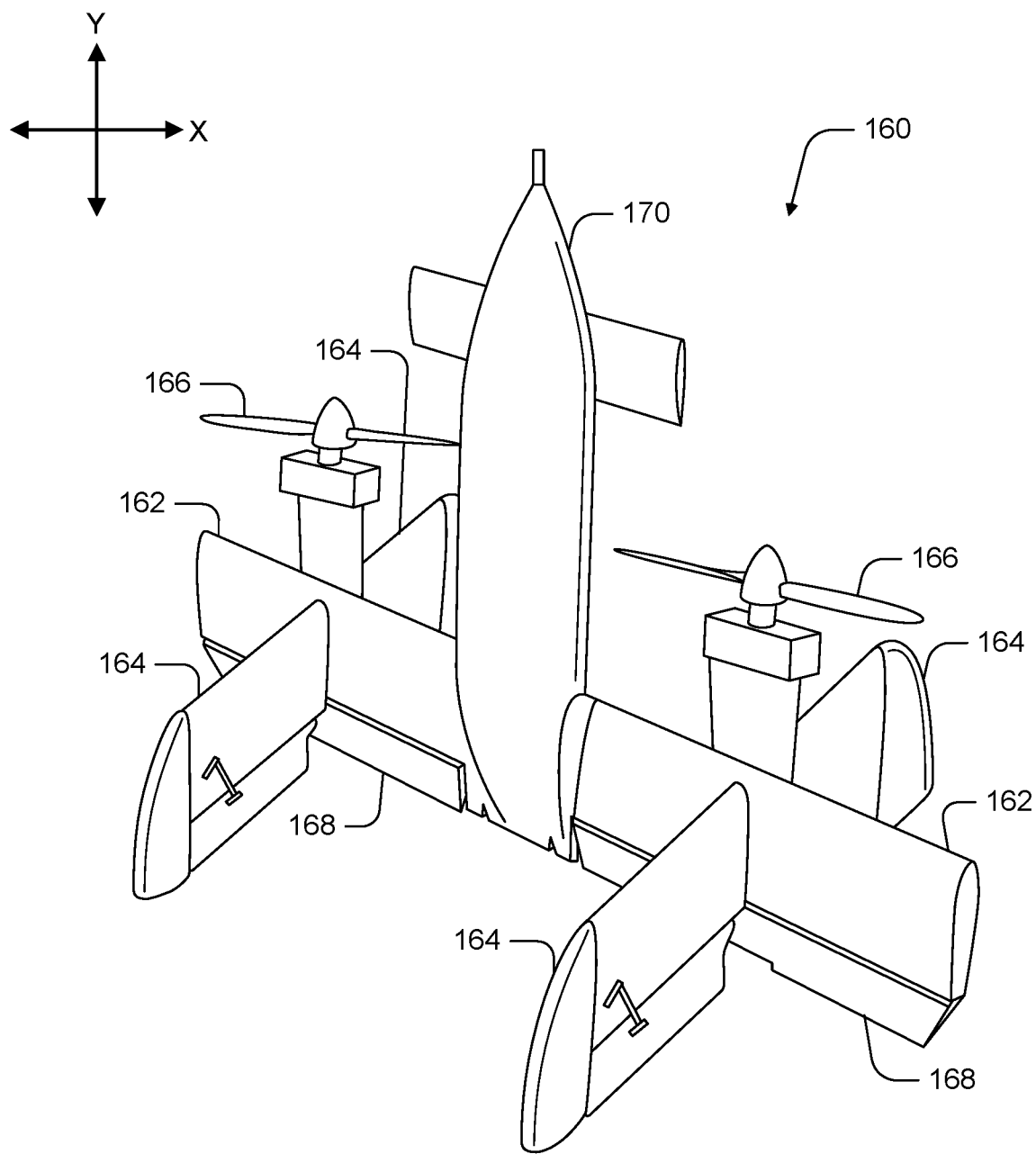
FIG. 1D is a simplified illustration of an unmanned aerial vehicle, according to an example embodiment.

FIG. 1D shows an example of a tail-sitter UAS 160. In the illustrated example, the tail-sitter UAS 160 has fixed wings 162 to provide lift and allow the UAS 160 to glide horizontally (e.g., along the x-axis, in a position that is approximately perpendicular to the position shown in FIG. 1D). However, the fixed wings 162 also allow the tail-sitter UAS 160 to take off and land vertically on its own.

For example, at a launch site, the tail-sitter UAS 160 may be positioned vertically (as shown) with its fins 164 and/or wings 162 resting on the ground and stabilizing the UAS 160 in the vertical position. The tail-sitter UAS 160 may then take off by operating its propellers 166 to generate an upward thrust (e.g., a thrust that is generally along the y-axis). Once at a suitable altitude, the tail-sitter UAS 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAS 160 can fly in a similar manner as a typical airplane.

Many variations on the illustrated fixed-wing UASs are possible. For instance, fixed-wing UASs may include more or fewer propellers, and/or may utilize a ducted fan or multiple ducted fans for propulsion. Further, UASs with more wings (e.g., an "x-wing" configuration with four wings), with fewer wings, or even with no wings, are also possible.

Figure 1E:
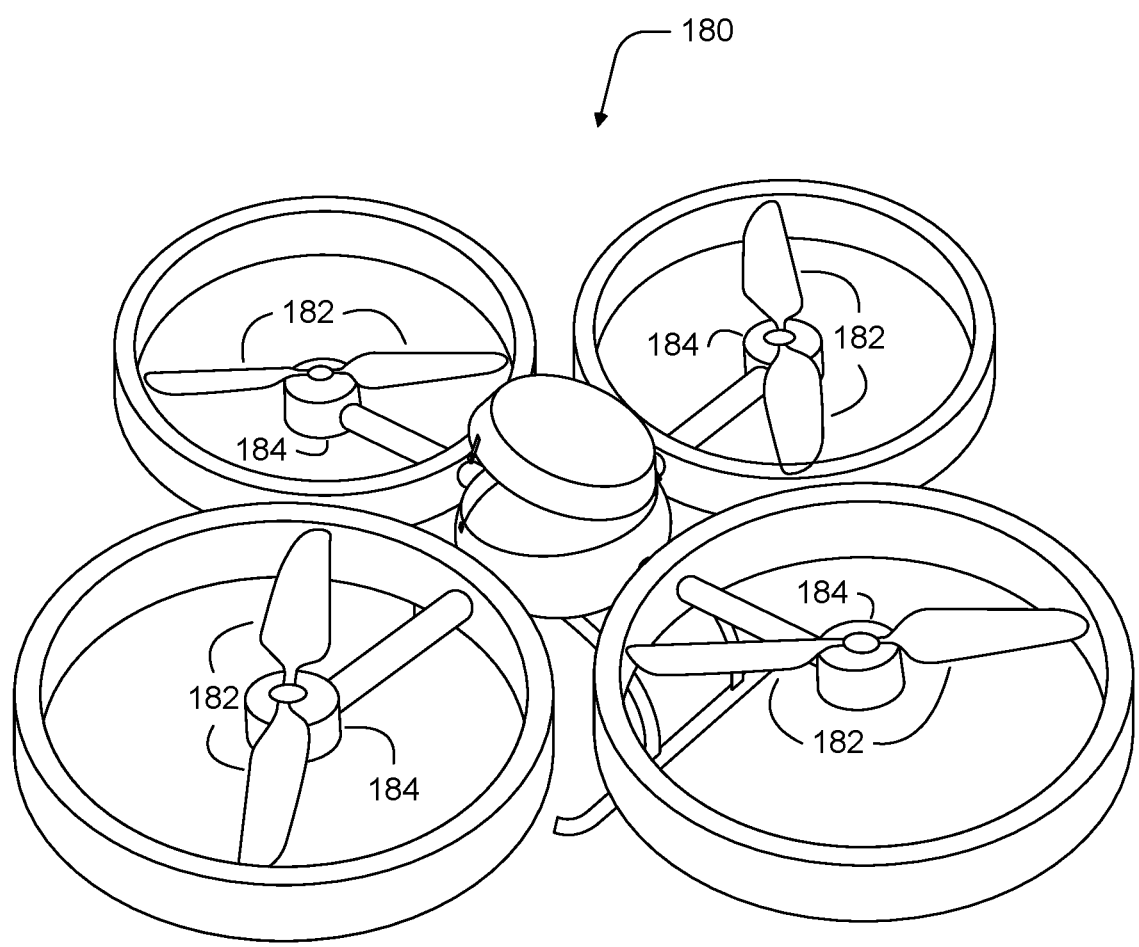
FIG. 1E is a simplified illustration of an unmanned aerial vehicle, according to an example embodiment.

As noted above, some embodiments may involve other types of UASs, in addition to or in the alternative to fixed-wing UASs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAS can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAS may be configured to allow a remote operator to take over functions that can otherwise be controlled autonomously by the UAS. Yet further, a given type of function may be controlled remotely at one level of abstraction and performed autonomously at another level of abstraction. For example, a remote operator could control high level navigation decisions for a UAS, such as by specifying that the UAS should travel from one location to another (e.g., from a warehouse in a suburban area to a delivery address in a nearby city), while the UAS's navigation system autonomously controls more fine-grained navigation decisions, such as the specific route to take between the two locations, specific flight controls to achieve the route and avoid obstacles while navigating the route, and so on.

More generally, it should be understood that the example UASs described herein are not intended to be limiting. Example embodiments may relate to, be implemented within, or take the form of any type of unmanned aerial vehicle.

III. Illustrative UAS Components

Figure 2:
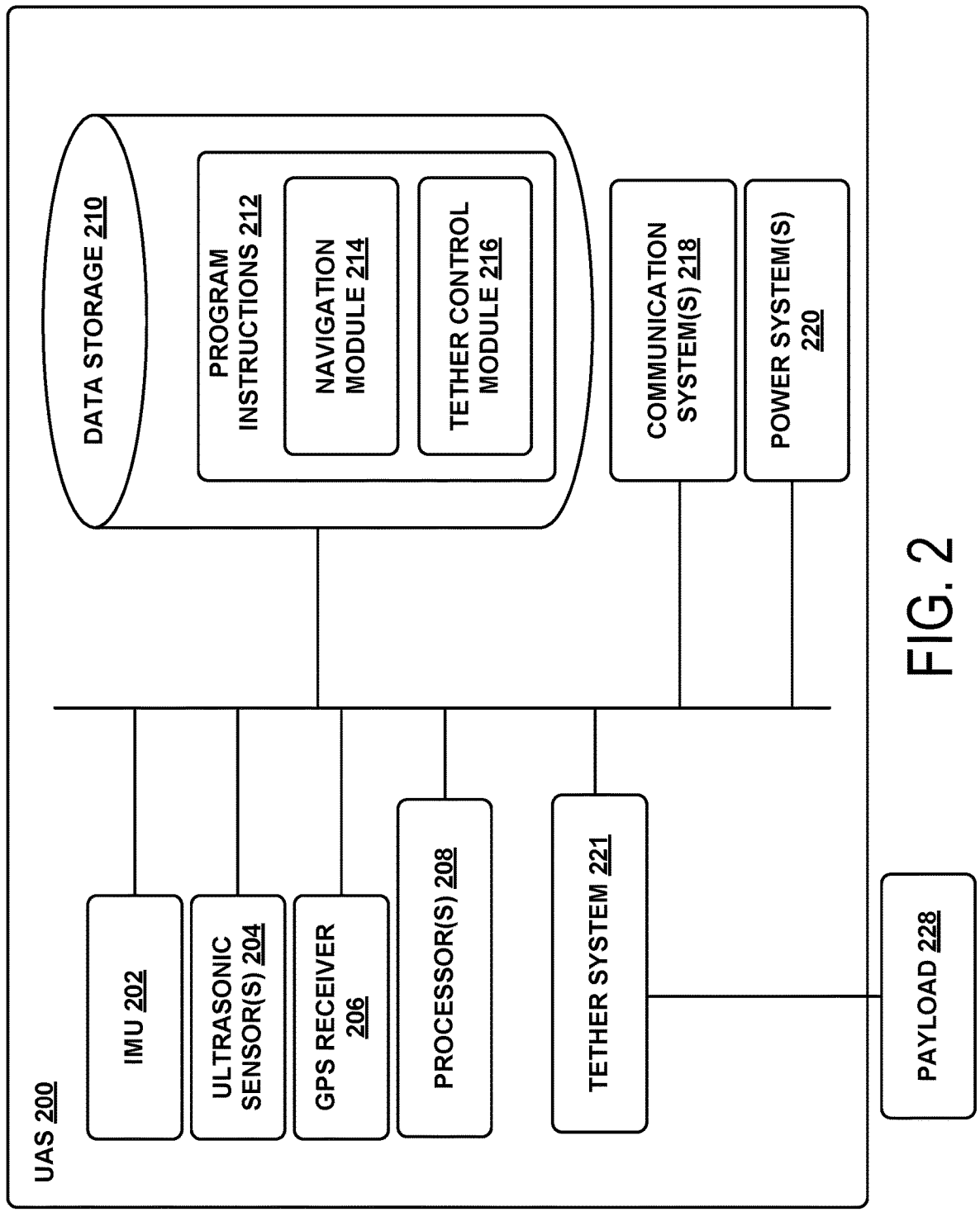
FIG. 2 is a simplified block diagram illustrating components of an unmanned aerial system, according to an example embodiment.

FIG. 2 is a simplified block diagram illustrating components of a UAS 200, according to an example embodiment. UAS 200 may take the form of, or be similar in form to, one of the UASs 100, 120, 140, 160, and 180 described in reference to FIGS. 1A-1E. However, UAS 200 may also take other forms.

UAS 200 may include various types of sensors, and may include a computing system configured to provide the functionality described herein. In the illustrated embodiment, the sensors of UAS 200 include an inertial measurement unit (IMU) 202, ultrasonic sensor(s) 204, and a GPS 206, among other possible sensors and sensing systems.

In the illustrated embodiment, UAS 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAS described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAS 200. As such, the data storage 210 may include program instructions 212 to perform or facilitate some or all of the UAS functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAS 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAS 200. Two examples of such sensors are magnetometers and pressure sensors. In some embodiments, a UAS may include a low-power, digital 3-axis magnetometer, which can be used to realize an orientation independent electronic compass for accurate heading information. However, other types of magnetometers may be utilized as well. Other examples are also possible. Further, note that a UAS could include some or all of the above-described inertia sensors as separate components from an IMU.

UAS 200 may also include a pressure sensor or barometer, which can be used to determine the altitude of the UAS 200. Alternatively, other sensors, such as sonic altimeters or radar altimeters, can be used to provide an indication of altitude, which may help to improve the accuracy of and/or prevent drift of an IMU.

In a further aspect, UAS 200 may include one or more sensors that allow the UAS to sense objects in the environment. For instance, in the illustrated embodiment, UAS 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAS 200 may also include one or more imaging system(s). For example, one or more still and/or video cameras may be utilized by UAS 200 to capture image data from the UAS's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAS 200 may also include a GPS receiver 206. The GPS receiver 206 may be configured to provide data that is typical of well-known GPS systems, such as the GPS coordinates of the UAS 200. Such GPS data may be utilized by the UAS 200 for various functions. As such, the UAS may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAS 200 to, e.g., move about its environment and reach a desired location. To do so, the navigation module 214 may control the altitude and/or direction of flight by controlling the mechanical features of the UAS that affect flight (e.g., its rudder(s), elevator(s), aileron(s), and/or the speed of its propeller(s)).

In order to navigate the UAS 200 to a target location, the navigation module 214 may implement various navigation techniques, such as map-based navigation and localization-based navigation, for instance. With map-based navigation, the UAS 200 may be provided with a map of its environment, which may then be used to navigate to a particular location on the map. With localization-based navigation, the UAS 200 may be capable of navigating in an unknown environment using localization. Localization-based navigation may involve the UAS 200 building its own map of its environment and calculating its position within the map and/or the position of objects in the environment. For example, as a UAS 200 moves throughout its environment, the UAS 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAS 200 to move from waypoint to waypoint, in order to ultimately travel to a final destination (e.g., a final waypoint in a sequence of waypoints).

In a further aspect, the navigation module 214 and/or other components and systems of the UAS 200 may be configured for "localization" to more precisely navigate to the scene of a target location. More specifically, it may be desirable in certain situations for a UAS to be within a threshold distance of the target location where a payload 228 is being delivered by a UAS (e.g., within a few feet of the target destination). To this end, a UAS may use a two-tiered approach in which it uses a more-general location-determination technique to navigate to a general area that is associated with the target location, and then use a more-refined location-determination technique to identify and/or navigate to the target location within the general area.

For example, the UAS 200 may navigate to the general area of a target destination where a payload 228 is being delivered using waypoints and/or map-based navigation. The UAS may then switch to a mode in which it utilizes a localization process to locate and travel to a more specific location. For instance, if the UAS 200 is to deliver a payload to a user's home, the UAS 200 may need to be substantially close to the target location in order to avoid delivery of the payload to undesired areas (e.g., onto a roof, into a pool, onto a neighbor's property, etc.). However, a GPS signal may only get the UAS 200 so far (e.g., within a block of the user's home). A more precise location-determination technique may then be used to find the specific target location.

Various types of location-determination techniques may be used to accomplish localization of the target delivery location once the UAS 200 has navigated to the general area of the target delivery location. For instance, the UAS 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAS 200 reaches the general area of the target delivery location (or of a moving subject such as a person or their mobile device), the UAS 200 may switch to a "fly-by-wire" mode where it is controlled, at least in part, by a remote operator, who can navigate the UAS 200 to the specific target location. To this end, sensory data from the UAS 200 may be sent to the remote operator to assist them in navigating the UAS 200 to the specific location.

As yet another example, the UAS 200 may include a module that is able to signal to a passer-by for assistance in either reaching the specific target delivery location, for example, the UAS 200 may display a visual message requesting such assistance in a graphic display, play an audio message or tone through speakers to indicate the need for such assistance, among other possibilities. Such a visual or audio message might indicate that assistance is needed in delivering the UAS 200 to a particular person or a particular location, and might provide information to assist the passer-by in delivering the UAS 200 to the person or location (e.g., a description or picture of the person or location, and/or the person or location's name), among other possibilities. Such a feature can be useful in a scenario in which the UAS is unable to use sensory functions or another location-determination technique to reach the specific target location. However, this feature is not limited to such scenarios.

In some embodiments, once the UAS 200 arrives at the general area of a target delivery location, the UAS 200 may utilize a beacon from a user's remote device (e.g., the user's mobile phone) to locate the person. Such a beacon may take various forms. As an example, consider the scenario where a remote device, such as the mobile phone of a person who requested a UAS delivery, is able to send out directional signals (e.g., via an RF signal, a light signal and/or an audio signal). In this scenario, the UAS 200 may be configured to navigate by "sourcing" such directional signals—in other words, by determining where the signal is strongest and navigating accordingly. As another example, a mobile device can emit a frequency, either in the human range or outside the human range, and the UAS 200 can listen for that frequency and navigate accordingly. As a related example, if the UAS 200 is listening for spoken commands, then the UAS 200 could utilize spoken statements, such as "I'm over here!" to source the specific location of the person requesting delivery of a payload.

In an alternative arrangement, a navigation module may be implemented at a remote computing device, which communicates wirelessly with the UAS 200. The remote computing device may receive data indicating the operational state of the UAS 200, sensor data from the UAS 200 that allows it to assess the environmental conditions being experienced by the UAS 200, and/or location information for the UAS 200. Provided with such information, the remote computing device may determine altitudinal and/or directional adjustments that should be made by the UAS 200 and/or may determine how the UAS 200 should adjust its mechanical features (e.g., its rudder(s), elevator(s), aileron(s), and/or the speed of its propeller(s)) in order to effectuate such movements. The remote computing system may then communicate such adjustments to the UAS 200 so it can move in the determined manner.

C. Communication Systems

In a further aspect, the UAS 200 includes one or more communication systems 218. The communications systems 218 may include one or more wireless interfaces and/or one or more wireline interfaces, which allow the UAS 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAS 200 may include communication systems 218 that allow for both short-range communication and long-range communication. For example, the UAS 200 may be configured for short-range communications using Bluetooth and for long-range communications under a CDMA protocol. In such an embodiment, the UAS 200 may be configured to function as a "hot spot;" or in other words, as a gateway or proxy between a remote support device and one or more data networks, such as a cellular network and/or the Internet. Configured as such, the UAS 200 may facilitate data communications that the remote support device would otherwise be unable to perform by itself.

For example, the UAS 200 may provide a WiFi connection to a remote device, and serve as a proxy or gateway to a cellular service provider's data network, which the UAS might connect to under an LTE or a 3G protocol, for instance. The UAS 200 could also serve as a proxy or gateway to a high-altitude balloon network, a satellite network, or a combination of these networks, among others, which a remote device might not be able to otherwise access.

D. Power Systems

In a further aspect, the UAS 200 may include power system(s) 220. The power system 220 may include one or more batteries for providing power to the UAS 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAS 200 may employ various systems and configurations in order to transport and deliver a payload 228. In some implementations, the payload 228 of a given UAS 200 may include or take the form of a "package" designed to transport various goods to a target delivery location. For example, the UAS 200 can include a compartment, in which an item or items may be transported. Such a package may one or more food items, purchased goods, medical items, or any other object(s) having a size and weight suitable to be transported between two locations by the UAS. In other embodiments, a payload 228 may simply be the one or more items that are being delivered (e.g., without any package housing the items).

In some embodiments, the payload 228 may be attached to the UAS and located substantially outside of the UAS during some or all of a flight by the UAS. For example, the package may be tethered or otherwise releasably attached below the UAS during flight to a target location. In an embodiment where a package carries goods below the UAS, the package may include various features that protect its contents from the environment, reduce aerodynamic drag on the system, and prevent the contents of the package from shifting during UAS flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAS. This may move some of the frontal area and volume of the package away from the wing(s) of the UAS, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAS and may cause the contents of the package to shift less during flight.

In order to deliver the payload, the UAV may include a tether system 221, which may$_{[CM1]}$ controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured$_{[CM1]}$ to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAS and/or a control system over a wireless link and used to help in determining when the release mechanism has reached ground level (e.g., by detecting a measurement with the accelerometer that is characteristic of ground impact). In other examples, the UAS may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAS 200 could include an air-bag drop system or a parachute drop system. Alternatively, a UAS 200 carrying a payload could simply land on the ground at a delivery location. Other examples are also possible.

IV. Illustrative Aerial Vehicle Charging Systems

Figure 3A:
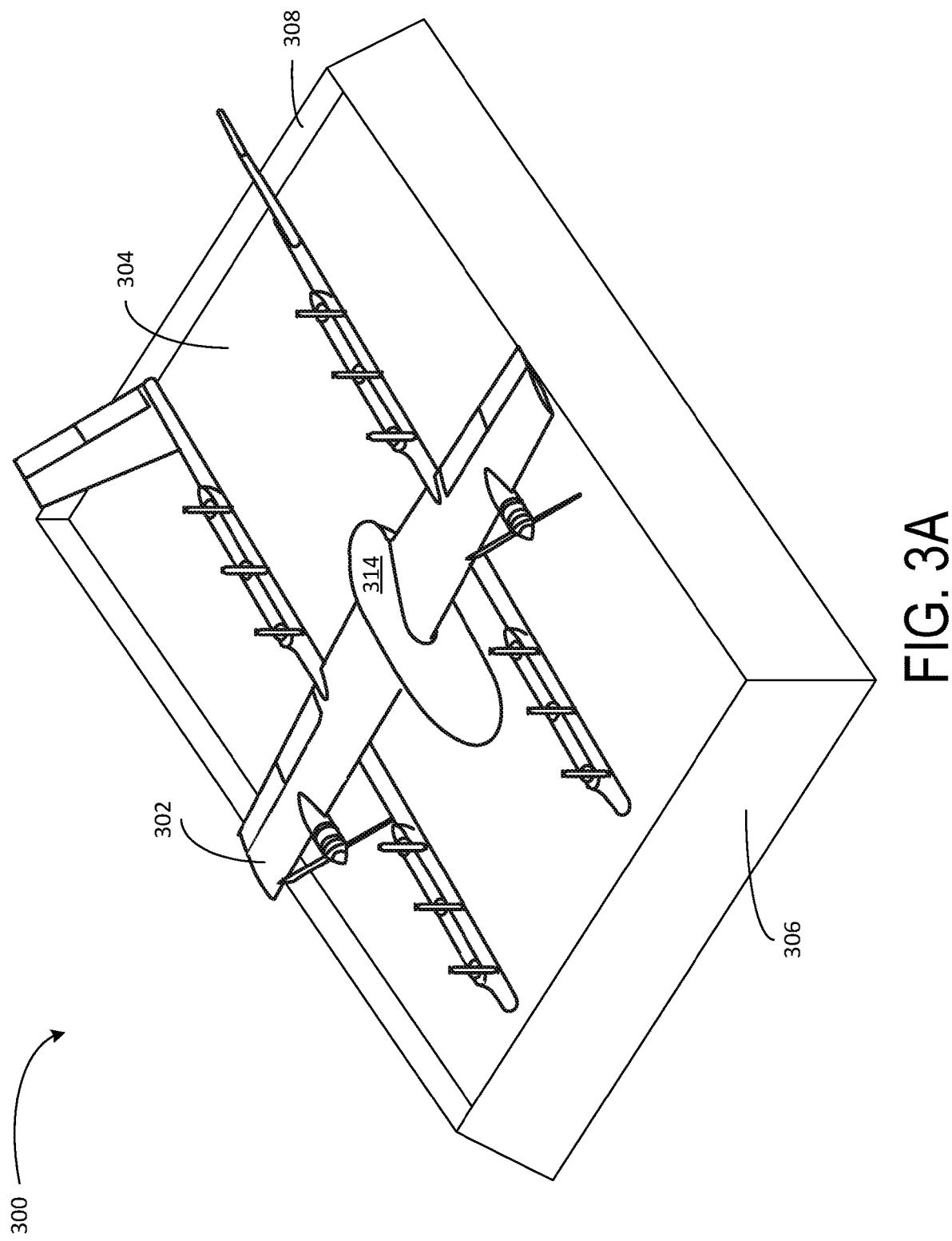
FIG. 3A is a perspective view of an aerial vehicle and a landing pad, according to an example embodiment.

FIG. 3A is a perspective view of an example system 300, according to an example embodiment. System 300 includes an aerial vehicle 302 having landed on a landing pad 306. While aerial vehicle 302 remains landed on landing pad 306, it may be said to be in a landing state. During the landing state, a charging terminal disposed ventrally to a fuselage 314 of aerial vehicle 302 may make contact with an electrically charged landing terminal 304 disposed dorsally to landing pad 306. Landing terminal 304 may draw electric power from a power terminal associated with the landing pad that, in turn, draws power from the power source. The power source may be included within the landing pad, or may be separate from the landing pad. For instance, the power source may be one or more batteries included within the landing pad, or may be an external power source, such as an outlet attached to an electric power grid, a generator, or a solar power collector, though other examples are possible as well. The charging terminal of the aerial vehicle may, in turn, draw electric power from the landing terminal for consumption by a power sink included within the aerial vehicle. A power sink may include, for example, a motor, battery, capacitor, or other electric elements configured to consume electric power.

In the present example, landing pad 306 includes a housing that includes a lip 308 that is disposed on an outer perimeter of landing terminal 304. The lip 308 may prevent wind from causing aerial vehicle 302 to slide off landing pad 306. The housing of landing pad 306 also includes a skirt that surrounds landing terminal 304. The skirt tapers away from the center of landing pad 306. The skirt may prevent landing pad 306 from shifting as aerial vehicle 302 lands, and may prevent the landing pad from moving in windy conditions. As described below, landing pad 306 may include several additional features that are configured to protect aerial vehicle 302 or to provide electric power to aerial vehicle 302 based on a situational context.

Figure 3B:
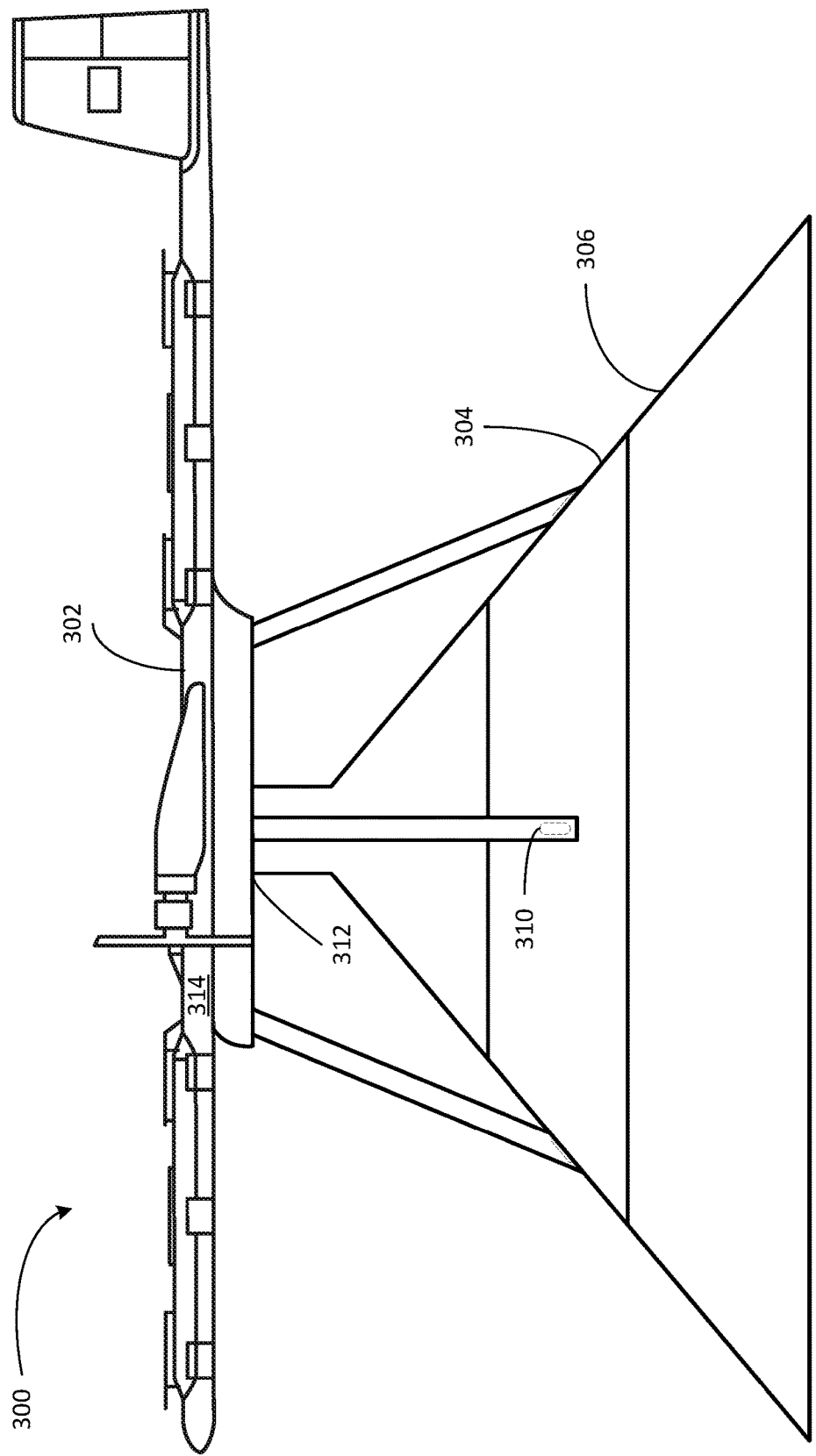
FIG. 3B is a side view of an aerial vehicle and a landing pad, according to another example embodiment.

Though FIG. 3A depicts a landing pad having a flat landing terminal, it should be understood that other configurations are possible. For instance, FIG. 3B illustrates a system 300 that includes an aerial vehicle 302 that has landed on a landing pad 306, according to another embodiment. In the the present example depicted by FIG. 3B, landing pad 306 may be conical, and include a truncated cone structure and a top landing surface 312. Top landing surface 312 may support a bottom surface of a fuselage of aerial vehicle 302. In the present example, aerial vehicle 302 includes a plurality of legs configured to contact a portion of landing terminal 304. The bottom surface and legs may all be included as parts of a charging terminal ventral to fuselage 314 of aerial vehicle 302. In the present example, landing terminal 304 may include at least a portion of the cone structure and top landing surface 312. In examples where the landing pad is conical, such as in the present example, the base footprint may be circular or elliptic, though other footprints are possible as well.

In the present example, landing terminal 304 is disposed dorsally to landing pad 306. Landing terminal 304 includes an electrically conductive node positioned on the conical feature and another electrically conductive node (not depicted) on the top landing surface 312. The aerial vehicle, in turn, may include electric contacts 312 configured to make contact with the nodes of the landing pad to draw electric power therefrom.

Figure 3C:
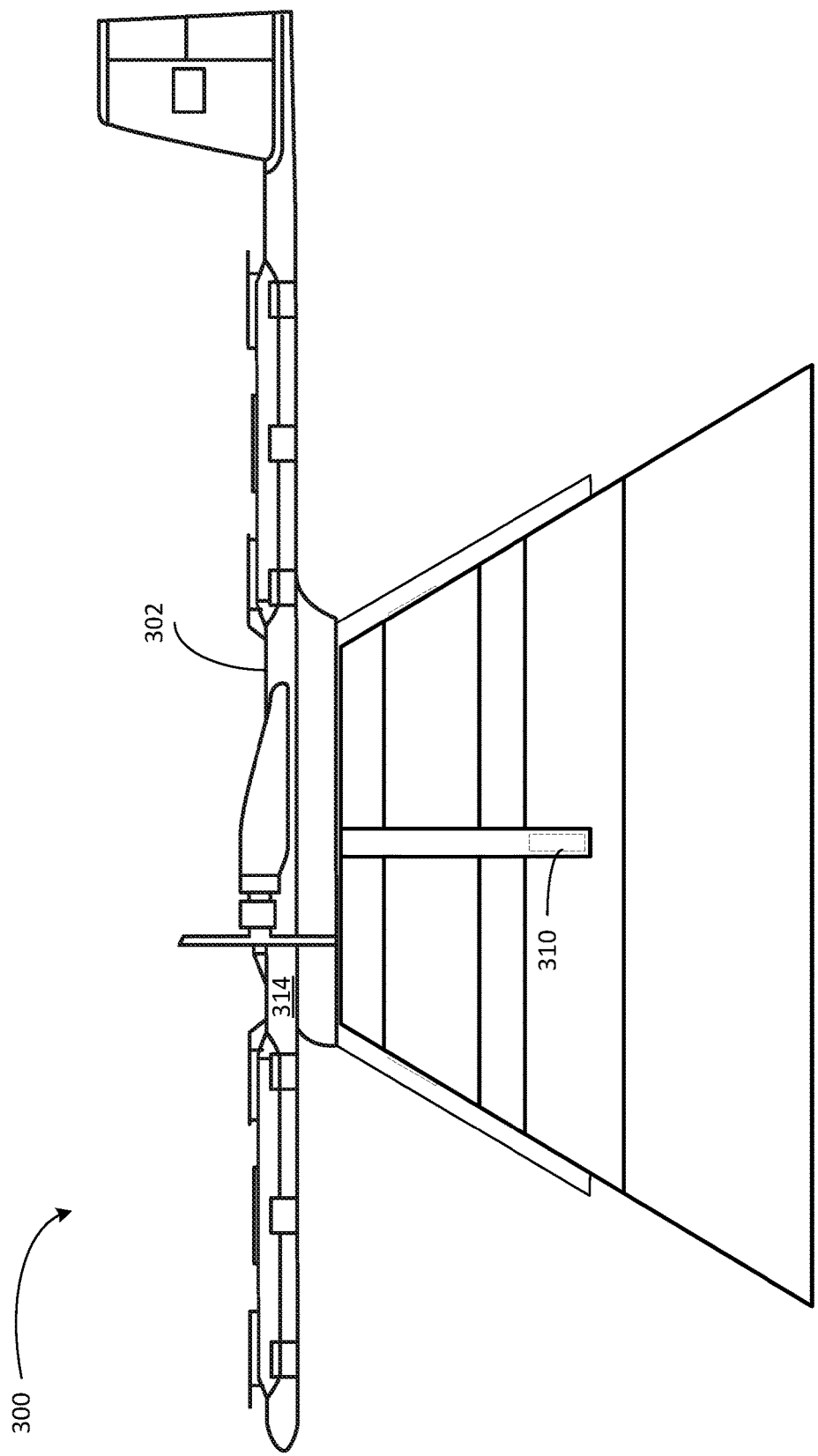
FIG. 3C is a side view of an aerial vehicle and a landing pad, according to another example embodiment.

FIG. 3C also depicts a system 300 that includes a non-flat landing terminal. In the present example, aerial vehicle 302 has landed on a landing terminal that is dorsal to the landing pad having a truncated pyramid structure. In such truncated pyramid examples, the landing pad may include a square, rectangle, or triangle footprint, though other footprints are possible as well. Like the example depicted in FIG. 3B, the landing pad has a top landing surface upon which a bottom surface of a fuselage of aerial vehicle 302 rests. Aerial vehicle 302 includes a plurality of legs, which have at least one electric contact 310 configured to make contact with a landing terminal of the landing pad The legs may each be included as part of a charging terminal ventral to fuselage 314.

In the present example, and in the example depicted in FIG. 3B, the landing pad and aerial vehicle are structured in a fashion that causes a desired pose of aerial vehicle 302. For instance, in the present example, the legs of aerial vehicle 302 may slip along the surface of the landing pad until they come to rest at the pose depicted in FIG. 3C, or a similar pose. It should be understood that additional ways of causing a desired pose of an aerial vehicle on the landing pad are possible as well. For instance, the aerial vehicle or landing pad may include additional features, such as grooves or appendages that guide the aerial vehicle to a desired pose. In other examples. the aerial vehicle and landing pad may communicate such that the aerial vehicle navigates to a predetermined pose on the landing pad. In other examples, the landing pad may include a visual indicator or a beacon that allow the aerial vehicle to navigate to land at the predetermined pose. In still other examples, the aerial vehicle and the landing pad may include magnetic features that draw the aerial vehicle to the desired pose once the aerial vehicle reaches or crosses a threshold proximity to the landing pad. Other examples of causing the pose of the aerial vehicle are possible as well.

Further, though FIGS. 3B and 3C depict aerial vehicle 302 as including a charging terminal having a concave shape and landing pad 306 as having a convex shape that together cause a pose of the aerial vehicle during the landing state of the aerial vehicle, it should be understood that, in some examples, those configurations may be reversed. That is, the landing terminal may be shaped in a concave fashion while the charging terminal of the aerial vehicle is convex. In each such example, the charging terminal may be understood to be ventral to the fuselage of the aerial vehicle, while the landing terminal may be understood to be dorsal to the landing pad, even where one or more electric contacts is disposed on a side wall or leg of the charging terminal rather than on a bottom surface of the charging terminal, or where one or more nodes is disposed on a side wall or appendage of the landing terminal rather than on a top surface of the landing terminal.

Figure 4A:
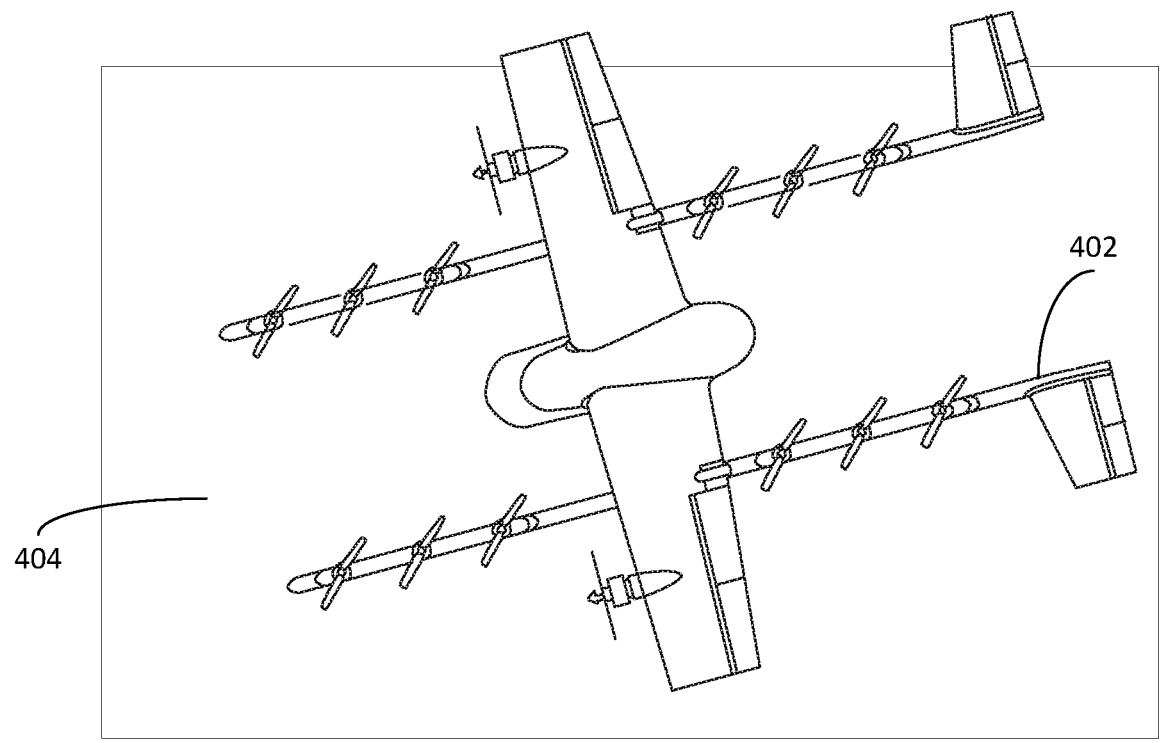
FIGS. 4A and 4B are top views of an aerial vehicle and a landing pad, according to an example embodiment.
Figure 4B:
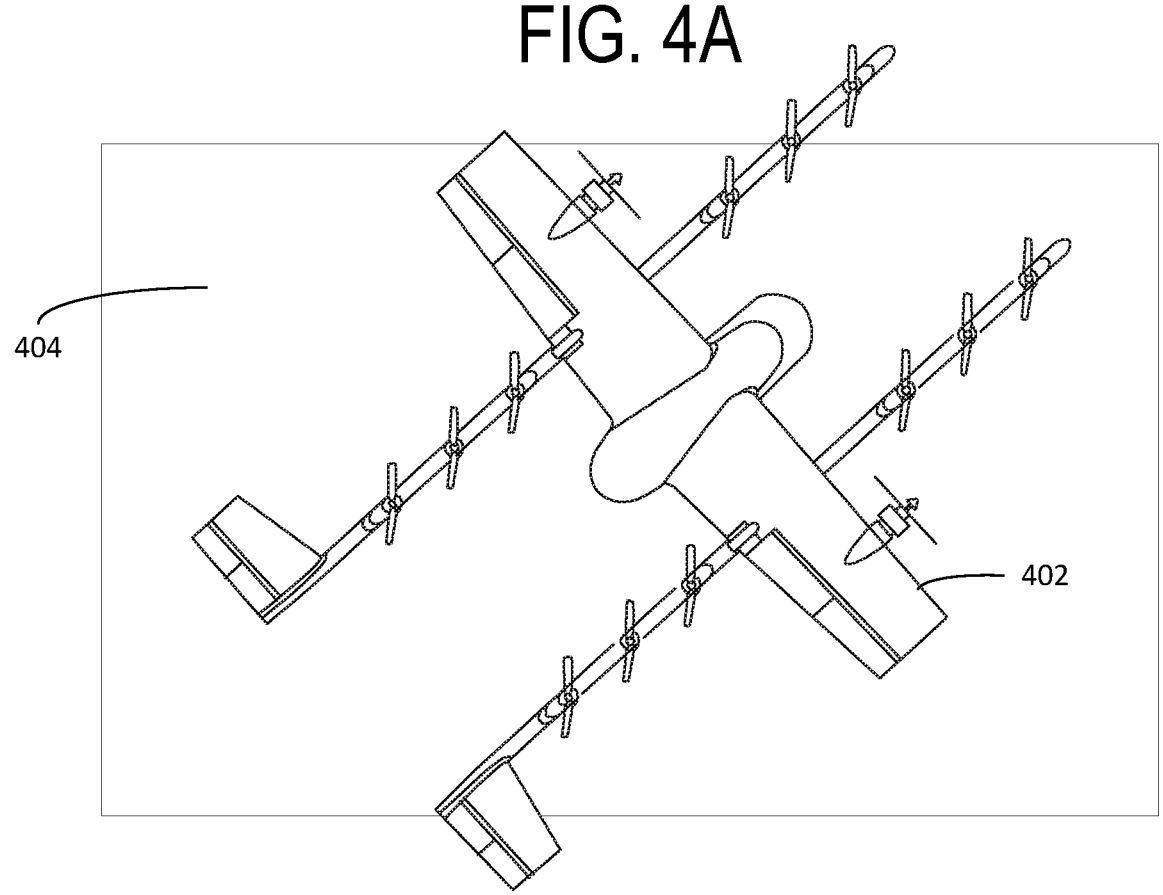

FIGS. 4A and 4B show an aerial vehicle 402 that has landed in different positions and orientations on a landing terminal 404 of a landing pad, according to an example embodiment. Aerial vehicle 402 may include a charging terminal disposed ventrally to a fuselage of the aerial vehicle. The charging terminal may make contact with landing terminal 404 during the landing states depicted in FIGS. 4A and 4B. A given position and orientation of an aerial vehicle may be referred to as a pose of the aerial vehicle. FIG. 4A depicts a first pose of aerial vehicle 402. At the first pose of aerial vehicle 402, a charging terminal associated with aerial vehicle 402 may be disposed at a first pose relative to landing terminal 404. FIG. 4B depicts a second pose of aerial vehicle 402. At the second pose of aerial vehicle 402, the charging terminal may be disposed at a second pose relative to landing terminal 404. The charging terminal of aerial vehicle 402 and landing terminal 404 may be configured such that, during a landing state of aerial vehicle 402, the charging terminal may draw electric power from landing terminal 404 regardless of a pose of the charging terminal relative to landing terminal 404.

It should be understood that, though landing terminal 404 may be similar to landing terminal 304 depicted in FIG. 3A, non-flat landing terminals such as those depicted in FIGS. 3B and 3C may similarly be configured such that, regardless of a pose of the aerial vehicle, the aerial vehicle may draw electric power from the landing terminal. For instance, in such examples, the landing pad and aerial vehicle may be configured such that the aerial vehicle can only land in a predetermined set of poses relative to the landing pad. Accordingly, in such examples the charging terminal associated with the aerial vehicle may fall in a predetermined set of poses relative to the landing terminal. In these examples, the aerial vehicle and landing terminal may be configured such that aerial vehicle draws electric power from the landing pad regardless of which pose of the set of poses at which the aerial vehicle has landed.

FIGS. 5A, 5B, and 5C depict a charging terminal of an aerial vehicle 500, according to an example embodiment. FIG. 5A depicts a side view of aerial vehicle 500. Aerial vehicle 500 may include a fuselage 514 and a charging terminal 502 disposed ventrally to fuselage 514. Though, in the present example, the charging terminal is simply disposed at a bottom surface of the fuselage, it should be understood that the charging terminal may be included within a landing mechanism of the aerial vehicle. For instance, the charging terminal may include one or more feet configured to support aerial vehicle 500 during a landing state of aerial vehicle 500. Regardless of the configuration of the charging terminal, the electric contacts may be disposed on the charging terminal such that, during the landing state, they contribute to the support of the aerial vehicle. In other examples, such that depicted in FIG. 3B, the charging terminal may include an electric contact at a bottom surface of a fuselage of the aerial vehicle, and other electric contacts disposed on one or more legs of the aerial vehicle. In still other examples, such as that depicted in FIG. 3C, the charging terminal may include electric contacts disposed exclusively on one or more legs of the aerial vehicle. In each such example, the charging terminal should be understood to be ventral to the fuselage. Other configurations of charging terminals are possible as well.

FIG. 5B depicts a side view of landing terminal 502. Landing terminal 502 includes electric contacts 504, 506, 508, and 510. Each of the electric contacts may be configured to make contact with a landing terminal of a landing pad during a landing state of aerial vehicle 500. Though, in the present example, electric contacts 504, 506, 508, and 510 are depicted as protruding beyond an outer surface of charging terminal 502, it should be understood that the electric contacts may not extend beyond an outer surface of charging terminal 502. In some examples, the electric contacts may be withdrawn into a recess 512 included within charging terminal 502. In this fashion, during a non-landing state of aerial vehicle 500, the electric contacts may be protected, and during a landing state of aerial vehicle 500, the electric contacts may make contact with a landing terminal.

In some examples, recess 512 may include a pressure-exerting element, such as a spring, actuator, piezoelectric element, or the like that is configured to exert a force on a given electric contact. In this fashion, the pressure-exerting element may ensure that a given electric contact exerts a contact pressure against a landing terminal during a landing state of aerial vehicle 500.

FIG. 5C depicts a bottom view of landing terminal 502. In the present example, electric contacts 504, 506, 508, and 510 are arranged in a fashion that may allow the aerial vehicle to draw electric power from a landing terminal of a landing pad regardless of a pose of charging terminal 502 relative to the landing terminal. Examples follow that depict configurations of electric contacts and landing terminals.

Figure 6A:
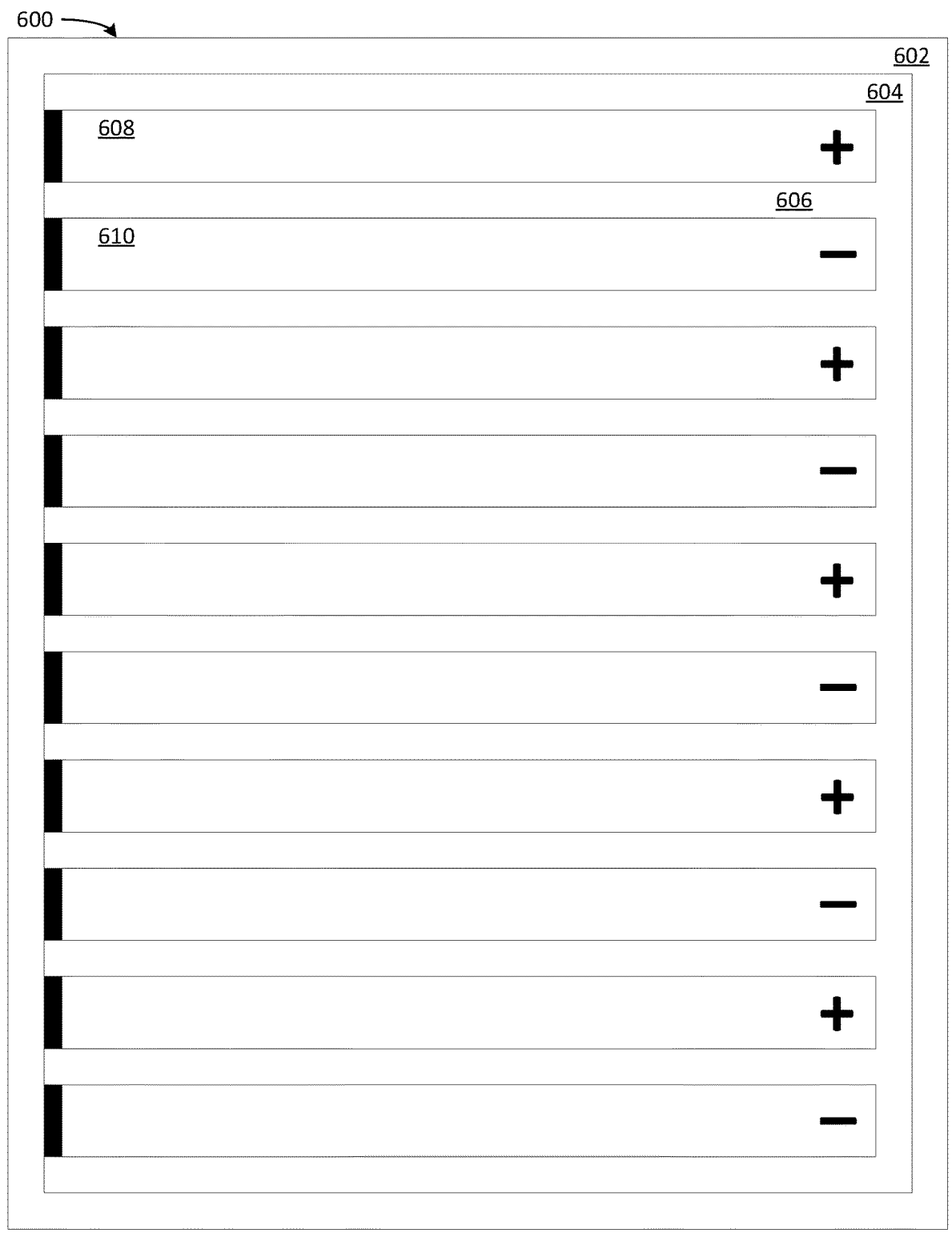
FIG. 6A is a simplified illustration of a landing pad, according to an example embodiment.

FIG. 6A depicts a top view of a landing pad 600, according to an example embodiment. In the present example, landing pad 600 includes a lip 602 that surrounds a landing terminal 604. Landing terminal 604 includes a non-conductive space 606, a plurality of positive nodes 608 and a plurality of negative nodes 610. In the present example, the positive nodes 608 and negative nodes 610 are arranged in a plurality of parallel strips separated by non-conductive gaps. The nodes may receive electric power from a power source associated with landing pad 600. In some examples, negative nodes 610 may be negatively charged. In other examples, negative nodes 610 may be grounded. The nodes and gaps may have widths that are compatible with multiple arrangements and sizes of electric contacts on a charging terminal associated with an aerial vehicle.

Figure 6B:
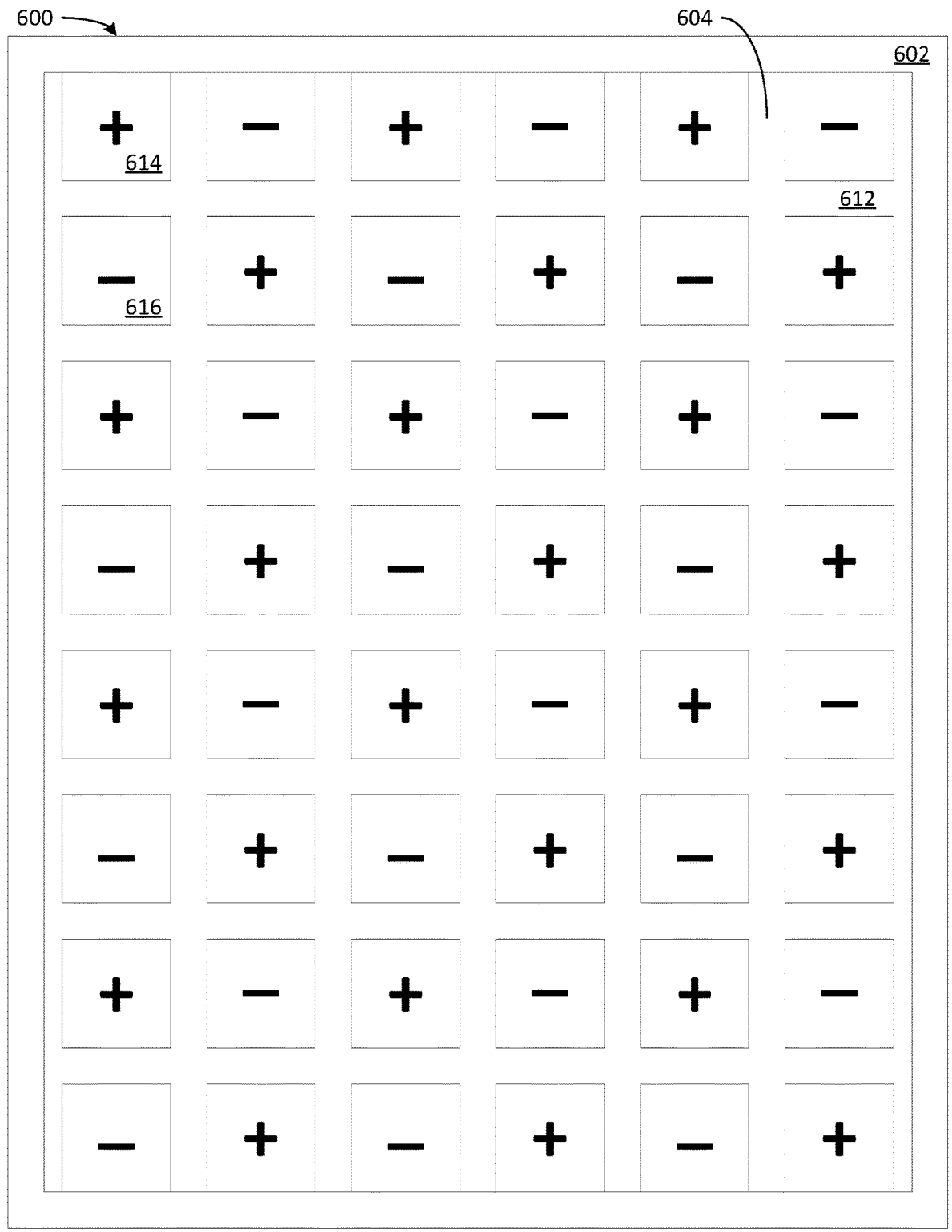
FIG. 6B is a simplified illustration of a landing pad, according to another example embodiment.

FIG. 6B depicts a top view of a landing pad 600, according to another example embodiment. In the present example, landing pad 600 includes a lip 602, and a landing terminal 604. Landing terminal 604 includes a non-conductive space 612 and a plurality of positive nodes 614 and negative nodes 616. In the present example, the nodes are arranged in a checkerboard configuration having a plurality of alternating positive and negative node tiles. The node tiles and gaps may have widths that are compatible with multiple arrangements and sizes of electric contacts on a charging terminal associated with an aerial vehicle.

Figure 6C:
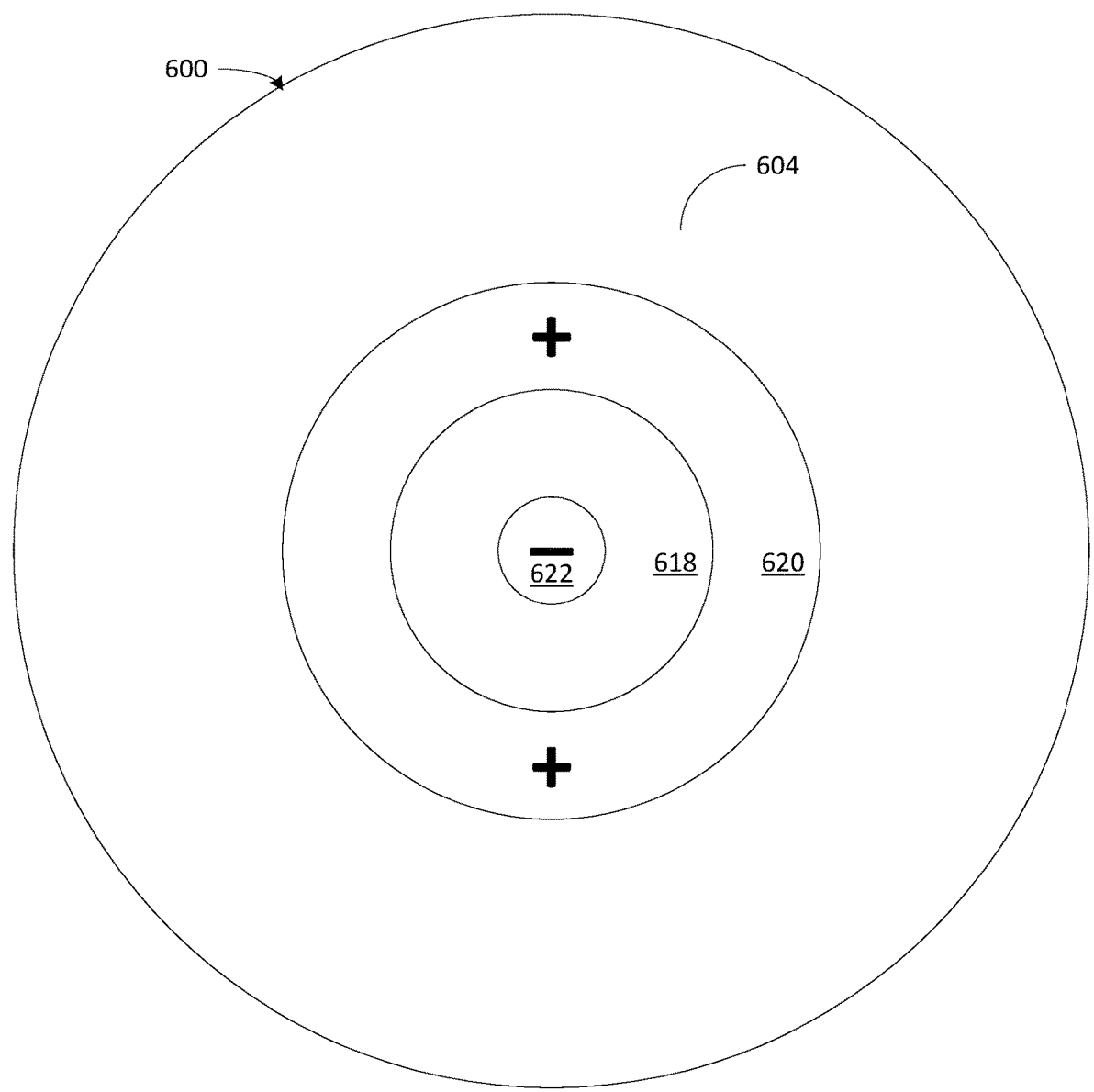
FIG. 6C is a simplified illustration of a landing pad, according to another example embodiment.

FIG. 6C depicts a top view of a landing pad 600, according to another example embodiment. In the present example, landing pad 600 is configured as a truncated cone having a top landing surface. In the present example, landing terminal 604 includes a single positive node 620 disposed on an outer surface of the cone, a single negative node 622 disposed on the top landing surface, and a non-conductive space 618 disposed between positive node 620 and negative node 622. Though, in the present example, a single negative node and a single positive node are depicted, it should be understood that the landing pad may include two or more of such nodes.

Figure 6D:
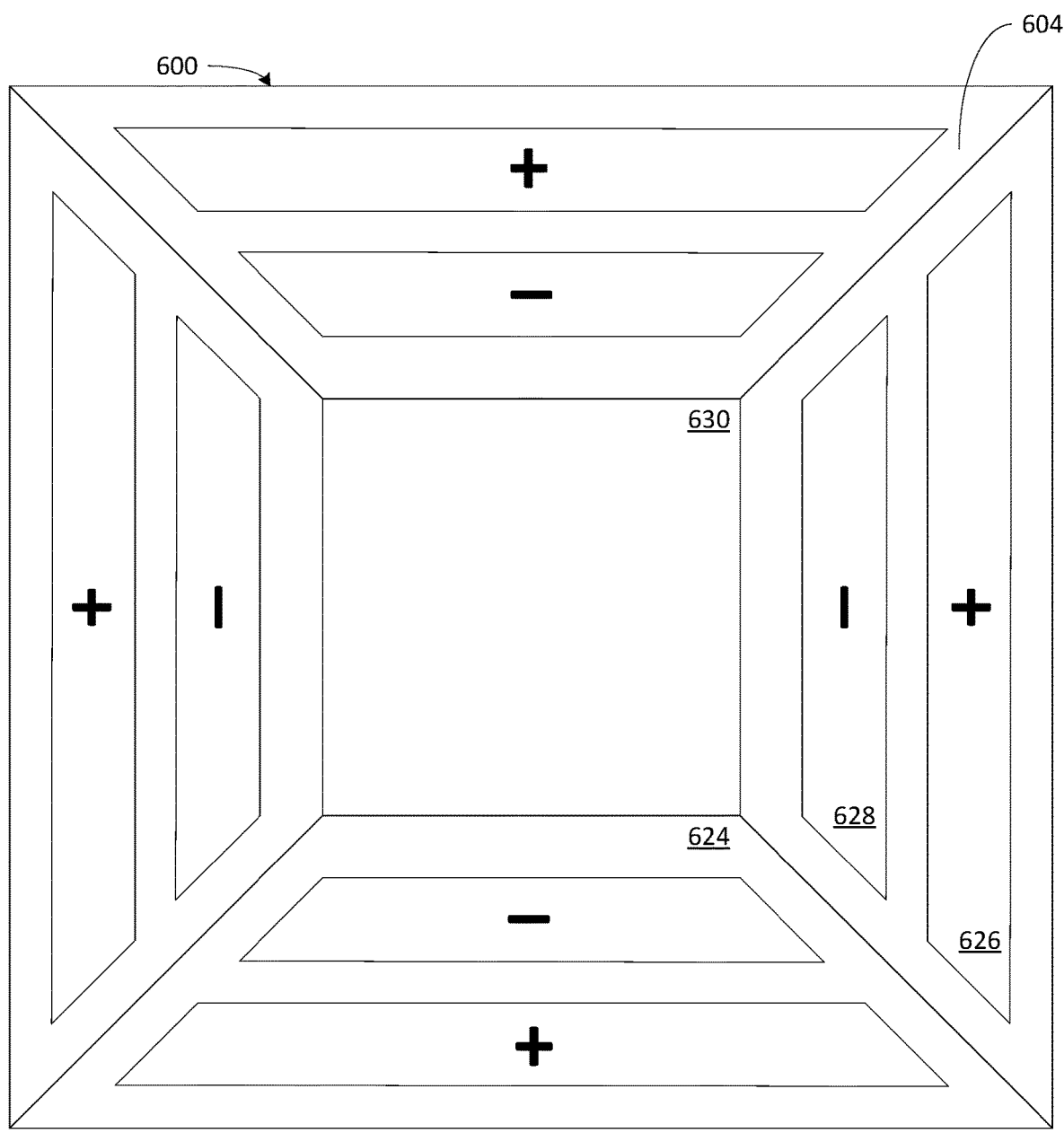
FIG. 6D is a simplified illustration of a landing pad, according to another example embodiment.

FIG. 6D depicts a top view of a landing pad 600, according to another example embodiment. In the present example, landing pad 600 is configured as a truncated square pyramid having a top landing surface 630. In the present example, landing terminal 604 includes a plurality of positive nodes 626, negative nodes 628, and a negative space 624 disposed between the nodes. Top landing surface 630 may include features such as a lip, recess, groove, or the like configured to assist in mechanically convincing a pose of the aerial vehicle. As discussed above with regard to FIGS. 3B and 3C, other ways of influencing the pose of an aerial vehicle are possible as well.

FIGS. 6A 6B, 6C, and 6D depict positive and negative nodes disposed on an outer surface of a landing terminal. FIGS. 6A 6B, 6C, and 6D may be understood to depict embodiments where the nodes provide direct current to an aerial vehicle during a landing state. In such direct current examples, the each positive node may have a greater voltage than each negative node for as long as the aerial vehicle is charging.

In other examples, the landing pad may be configured such that the nodes provide alternating current to the aerial vehicle during the landing state of the aerial vehicle. In such embodiments, certain nodes (e.g., those depicted as negative nodes in FIGS. 6A 6B, 6C, and 6D) may be connected to ground while others are "hot" (e.g., those depicted as positive nodes in FIGS. 6A 6B, 6C, and 6D), or different nodes may be associated with different phases of an alternating current power signal. In these alternating current examples, a given first set of nodes (e.g., the positive nodes depicted in FIGS. 6A 6B, 6C, and 6D) and a given second set of nodes (e.g., the negative node depicted in FIGS. 6A 6B, 6C, and 6D) may have therebetween an average difference in voltage greater than zero. That is, an absolute value of the voltage potential of a given node of the first set of nodes subtracted by a voltage potential of a given node of the second set of nodes may be greater than zero at most given times. In this fashion, the landing terminal may be configured to provide an aerial vehicle with either direct current or alternating current.

Though the detailed description generally discusses positive and negative nodes associated with a landing terminal of a landing pad, it should be understood that, generally, the nodes may include at least a first set of nodes and a second set of nodes having an average difference in voltage therebetween that is greater than zero. Further, as described above with regard to FIG. 6C, the nodes may simply include a pair of nodes having an average difference in voltage therebetween that is greater than zero. As such, it should be understood that, as described herein, the first set of nodes includes one or more nodes and the second set of nodes includes one or more nodes.

Though FIGS. 6A and 6B only depict two arrangements of nodes that are configured to accommodate multiple sizes, arrangements, and poses of electric contacts associated with a charging terminal of an aerial vehicle, it should be readily understood by those having skill in the art that other such arrangements of nodes are possible. Further, though the plurality of positive nodes and negative nodes are depicted as being disposed on a top surface of landing terminal 604, it should be understood that in some embodiments such nodes may be disposed beneath a top surface of the landing terminal. For instance, in some examples, landing terminal 604 may be configured to inductively charge an aerial vehicle that has landed on an outer surface of the landing terminal.

Contact between electric contacts of a charging terminal associated with an aerial vehicle and nodes of a landing terminal associated with a landing pad may include physical contact between the electric contacts and the nodes. Such physical contact may occur during a landing state of the aerial vehicle where the nodes of the landing terminal are disposed on an outer or top surface of the landing terminal. In other examples, an intermediate material may physically separate the electric contacts of the charging terminal from the nodes of the vehicle, but may nonetheless permit the flow of electricity between the electric contacts and the nodes. Such may be the case where the landing terminal is configured to inductively charge the aerial vehicle. As such, contact between electric contacts of a charging terminal nodes of a landing terminal may generally relate to a proximity of the electric contacts to the nodes that allows for the nodes to transfer electric power to the aerial vehicle via the electric contacts of the charging terminal.

FIG. 7A depicts a plurality of electric contacts associated with charging terminal (not shown) of an aerial vehicle that have made contact with a landing terminal of a landing pad. In the present example, the landing pad may be configured substantially as described above with regard to FIG. 6A. That is, the landing terminal includes a non-conductive space 606 disposed between positive nodes 608 and negative nodes 610. In the present example, the charging terminal includes electric contacts 504, 506, 508, and 510, which are disposed within a radius (r) of a point central to the electric contact. Electric contact 508 is disposed on the central point, while electric contacts 504, 506, and 510 are oriented radially about the central point. Electric contacts 504, 506, and 510 are disposed within an outer edge of radius (r), and are spaced 120° from one another on a radial axis central to the electric contacts.

FIG. 7A depicts a system 700 having a scenario wherein at least one electric contact makes contact with a positive node and wherein at least one electric contact makes contact with a negative node. Because the charging terminal only includes four electric contacts, and because at least one given electric contact makes contact with a positive node and at least one given electric contact makes contact with a negative node, no more than two electric contacts make contact with a non-conductive gap. In the present example, electric contacts 504 and 506 are in contact with a negative node, electric contact 508 is in contact with a positive node, and electric contact 510 falls just short of another negative node such that it makes contact with a non-conductive gap of non-conductive space 606, but does not make contact with a positive or negative node. However, in the present example, the contacts are spaced such that, should electric contacts 504 and 506 move so as to stop contacting the node, electric contact 510 would start to contact a node. As such, in the present example, the nodes span the widths of two gaps (y) and a node (x).

FIG. 7A also depicts a base-case scenario for a landing state of an aerial vehicle on a landing pad. In the base case scenario, a width of each gap (y) between positive and negative nodes is wider than an electric contact having a diameter (d). As such, in the base case scenario, y>d. In the base case scenario, radius (r) is also long enough such that electric contacts 504, 506, and 510 span the width of two gaps (y) and a node (x). As such, in the base case scenario, $$r \geq \frac{2x}{3} + \frac{4y}{3}.$$

In the base case scenario, a first distance (a) between a far point of electric contact 508 and a gap may meet or exceed a second distance (b) between a near point of electric contact 510 and an electric node. As such, in the base case scenario, r≥4y−3d.

In the base case scenario, regardless of a pose of the charging terminal of the aerial vehicle relative to the landing terminal of the landing pad, one of electric contacts 504, 506, 508, and 510 will contact a positive node of the landing terminal, and one of the electric contacts will contact a negative node. As such, regardless of a pose of the charging terminal relative to the landing terminal, the aerial vehicle will draw electric power from the landing pad.

In some examples, a radius associated with the electric contacts may share a predefined dimensional relationship with another component of the system. For instance, the radius may fall within a range of 0.75 to 1.0 times the width of a node of the landing terminal. In other examples, the radius may fall within a range of 0.8 and 1.2 times the width of the node. In additional examples, two or more contacts of the charging terminal may be separated by a distance that falls within a range of 1.5 to 2.0 times the width of the node. Other ranges and relationships are possible as well.

Though the base case scenario described with regard to FIG. 7A includes particular dimensions, it should be understood that different landing terminal and charging terminal configurations may allow for different base case relationships that still allow for the charging terminal to draw electric power from the landing terminal regardless of a relative pose of the charging terminal to the landing terminal.

Further, though the charging terminal of the aerial vehicle and the landing terminal of the landing pad may be configured such that the charging terminal draws electric power from the landing terminal regardless of a relative pose of the charging terminal to the landing terminal, the aerial vehicle and the landing pad may communicate to facilitate a pose of the charging terminal relative to the landing terminal during the landing state of the aerial vehicle. In such examples, the aerial vehicle may recognize a visual indication or a beacon associated with the landing pad, or may communicate with the landing pad to facilitate the pose. For instance, where the landing terminal includes nodes that are arranged as parallel strips, as described above with regard to FIG. 6A, the aerial vehicle may navigate such that, during the landing state of the aerial vehicle, a line spanning an anterior end and a posterior end of the aerial vehicle is substantially perpendicular to the nodes. In some examples, the aerial vehicle may navigate such that a line spanning a given pair of electric contacts is substantially perpendicular to the nodes.

In such examples, as few as three electric contacts of the charging terminal may be configured to contact the landing terminal. For instance, three electric contacts may be disposed in a linear fashion and spaced such that no more than one electric contact falls within a non-conductive gap at the pose. Additional contacts may be included within the charging terminal such that, should the aerial vehicle fail to land in the pose, the aerial vehicle may nonetheless draw electric power from the landing terminal via the electric contacts. In still other examples, the aerial vehicle may navigate such that the charging terminal is disposed at a location substantially central to the landing terminal. Other poses of the charging terminal relative to the charging terminal are possible as well.

By the term "substantially" it is meant that the recited characteristic, parameter, or value need not be achieved exactly, but that deviations or variations, including for example, tolerances, measurement error, measurement accuracy limitations and other factors known to those having skill in the art, may occur in amounts that do not preclude the effect the characteristic was intended to provide.

Figure 7B:
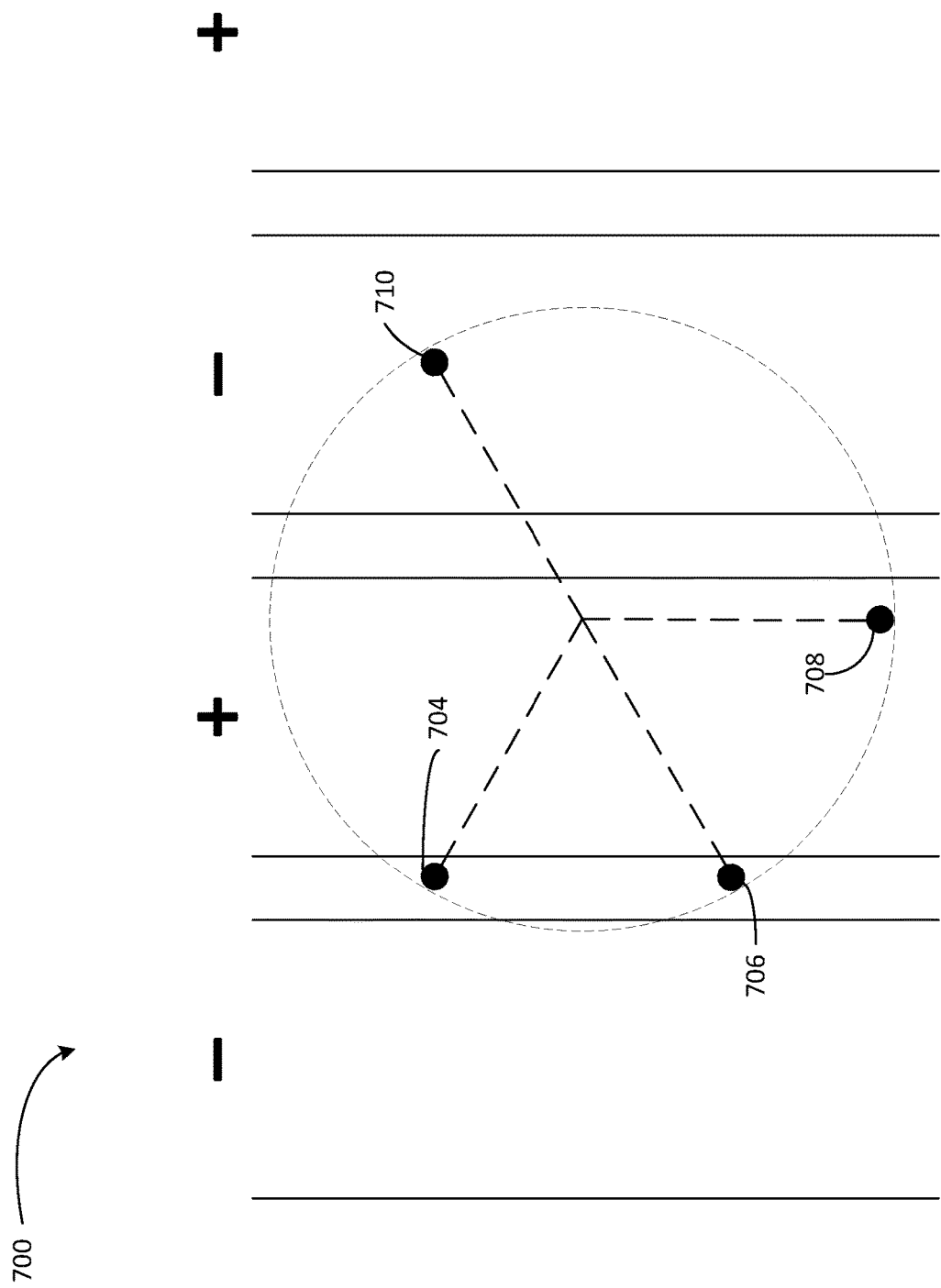
FIG. 7B is a simplified illustration of a charging terminal making contact with a landing terminal, according to another example embodiment.

FIG. 7B depicts another scenario of system 700 wherein at least one electric contact makes contact with a positive node and wherein at least one electric contact makes contact with a negative node. As in the configuration described above with regard to FIG. 7A, the landing terminal includes multiple positive and negative nodes arranged in parallel strips disposed on a surface of the landing terminal. However, in the present example, the electric contacts 704, 706, 708, and 710 fall within a second radius larger than that depicted in FIG. 7A. Further, in the present example, the electric contacts are arranged without a central electric contact. Rather, contact 706 is disposed 60° from contacts 704 and 708 on a radial axis central to the electric contacts. It should be understood that, though the configuration of electric contacts depicted in FIG. 7B is different than that described above with regard to FIG. 7A, the arrangement may nonetheless adhere to the base case scenario described above. That is, given a width of a node (x), a width of a gap between nodes (y), a diameter of an electric contact (d), and a radius (r), $$y > d, r \geq \frac{2x}{3} + \frac{4y}{3},$$

and r≥4y−3d.

Figure 7C:
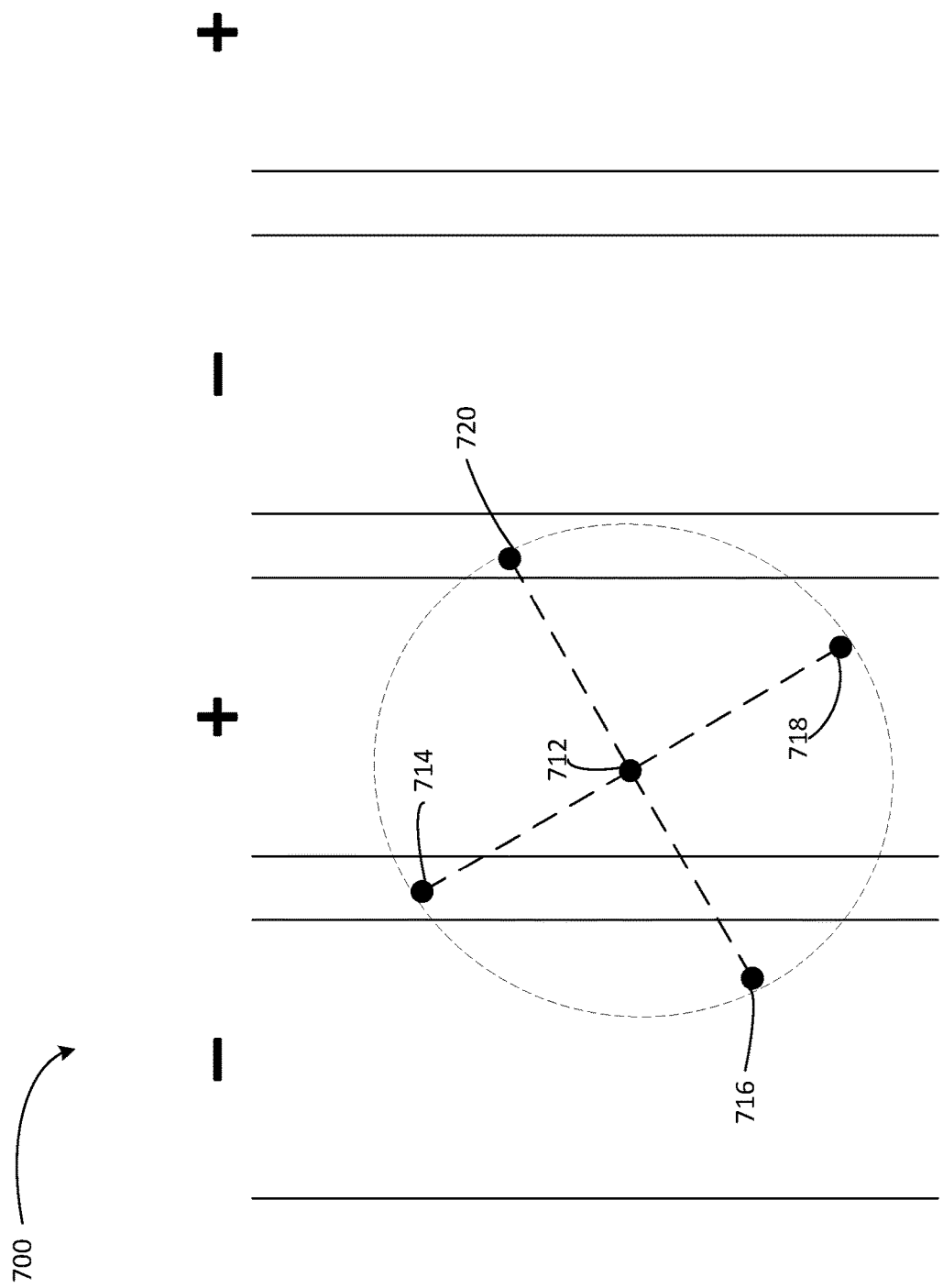
FIG. 7C is a simplified illustration of a charging terminal making contact with a landing terminal, according to another example embodiment.

Though FIGS. 7A and 7B depict configurations wherein the charging terminal of the aerial vehicle only includes four electric contacts, other embodiments may include configurations that allow for five or more electric contacts. For instance, FIG. 7C depicts an example that includes five contacts. FIG. 7C depicts a configuration that includes a central electric contact 712 and electric contacts 714, 716, 718, and 720 disposed 90° from one another on a radial axis central to the electric contacts.

Further, though FIGS. 7A, 7B, and 7C depict landing terminals like that described above with regard to FIG. 6A, it should be understood that other landing terminal configurations may be used that, during a landing state of the aerial vehicle, allow the electric contacts of the charging terminal to make contact with the landing terminal such that the landing terminal provides electric power to the aerial vehicle via the electric contacts.

Figure 7D:
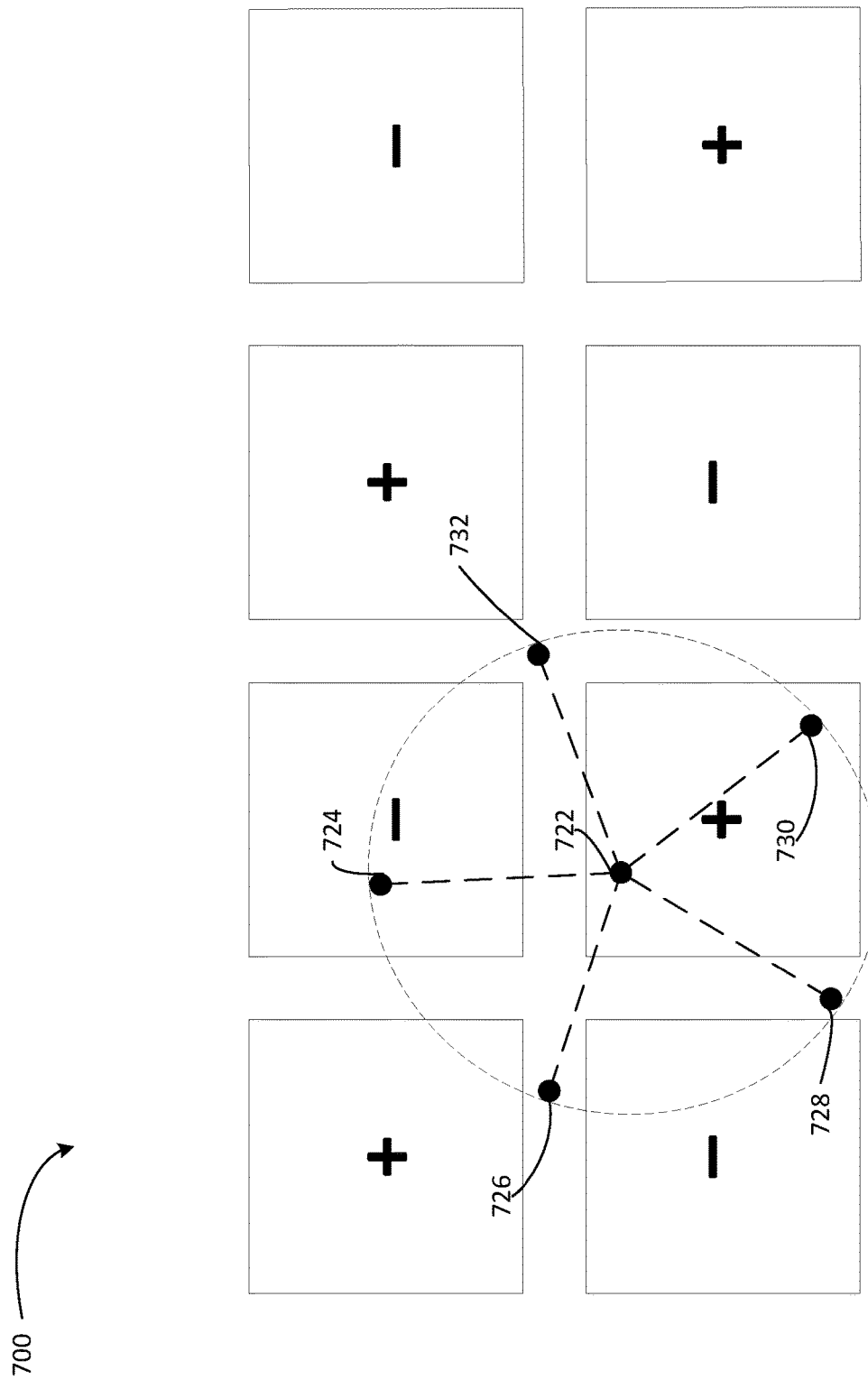
FIG. 7D is a simplified illustration of a charging terminal making contact with a landing terminal, according to another example embodiment.

For instance, FIG. 7D depicts a system 700 having a configuration that includes a landing terminal similar to that described above with regard to FIG. 6B. The configuration includes a charging terminal that includes a central electric contact 722 and electric contacts 724, 726, 728, 730, and 732 disposed 72° from one another on a radial axis central to the electric contacts. It should be understood that some landing terminal configurations may require a larger number of, or different arrangements of, electric contacts on a charging terminal associated with an aerial vehicle.

In some examples, different aerial vehicles may include different configurations of electric contacts. In some examples, a landing pad may be able to determine a type of aerial vehicle based on how many tiles have been contacted during a landing state of the aerial vehicle. In response, a controller of the landing pad may alter a voltage level or power output based on the determined aerial vehicle type.

Though FIG. 7D depicts a different landing terminal arrangement than that described above with regard to FIGS. 7A, 7B, and 7C, it should be understood that the arrangement may nonetheless adhere to the base case scenario described above with regard to FIG. 7A. That is, given a width of a node (x), a width of a gap between nodes (y), a diameter of an electric contact (d), and a radius (r), $$y > d, r \geq \frac{2x}{3} + \frac{4y}{3},$$

and r≥4y−3d. However, different base cases may exist for charging terminals that have more than four electric contacts, and for landing terminals arranged differently than those depicted in FIGS. 6A and 6B.

In FIGS. 7A, 7B, 7C, and 7D, the electric contacts may be disposed in a substantially planar fashion. Similarly, the landing terminal may be disposed in a substantially planar fashion, such that, during the landing state, the electric contacts have similar contact pressures on a surface of the landing terminal. In some examples, the landing terminal may be slightly crowned or tilted, and the electric contacts may be arranged accordingly. However, even where the landing pad is crowned or tilted, the electric contacts may still be disposed in a substantially planar fashion.

As noted above, by the term "substantially" it is meant that the recited characteristic, parameter, or value need not be achieved exactly, but that deviations or variations, including for example, tolerances, measurement error, measurement accuracy limitations and other factors known to those having skill in the art, may occur in amounts that do not preclude the effect the characteristic was intended to provide.

FIG. 7E depicts another scenario of system 700 wherein at least one electric contact makes contact with a positive node and wherein at least one electric contact makes contact with a negative node. The landing terminal in the present example may be configured as described above with regard to FIGS. 3B and 6C. In the present example, a charging terminal of the aerial vehicle may include two electric contacts 734 and 736. The contacts may be associated with a charging terminal of an aerial vehicle that includes a bottom surface of a fuselage of an aerial vehicle and one or more legs, though other configurations of the charging terminal are possible. Contact 734 may be disposed on the bottom surface of the fuselage, while contact 736 may be disposed on a leg of the aerial vehicle. Further, the aerial vehicle and landing pad may configured such that contact 734 is always aligns with node 622 during the landing state, while electric contact 736 always aligns with node 620.

In the present example, the aerial vehicle may be configured to land in a predefined set of poses relative to the landing pad. For example, the aerial vehicle may be configured to navigate to a single pose relative to the landing pad. In other examples, the aerial vehicle and landing pad may be configured to cause a pose of the aerial vehicle such that the aerial vehicle can land anywhere along a radius, or set of radii, along an outer surface of the landing terminal.

Though the present example includes a positive node 620, negative node 622, and a non-conductive space 618 similar to those depicted in FIGS. 7A-D, it should be understood that the present example may not necessarily adhere to the same configurations described with regard to those Figures. For instance, the base case scenario described above with regard to FIG. 7A may not apply to the present example.

Figure 7F:
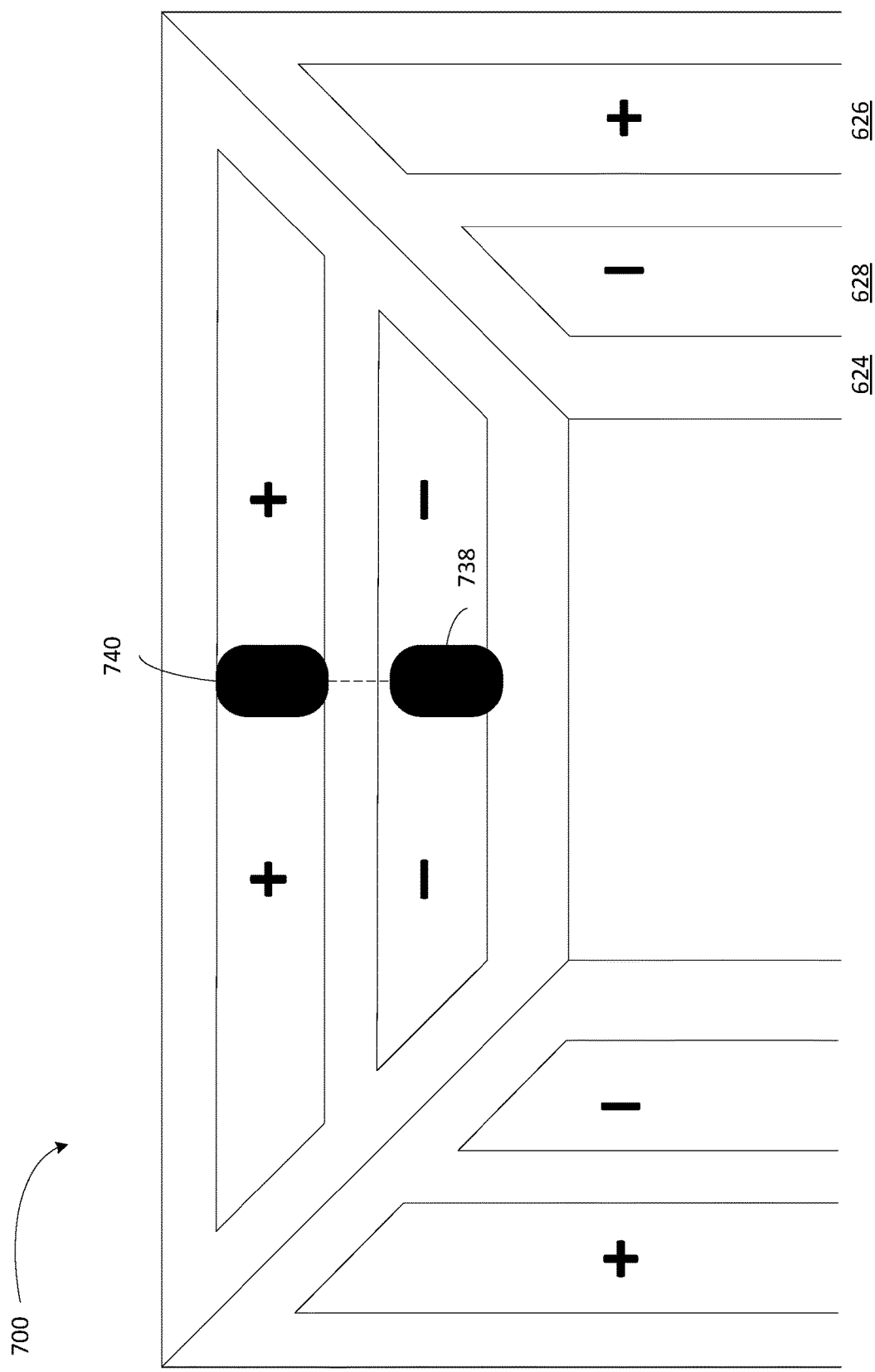
FIG. 7F is a simplified illustration of a charging terminal making contact with a landing terminal, according to another example embodiment.

FIG. 7F depicts another scenario of system 700 wherein at least one electric contact makes contact with a positive node and wherein at least one electric contact makes contact with a negative node. The landing terminal in the present example may be configured as described above with regard to FIGS. 3C and 6D. In the present example, a charging terminal of the aerial vehicle of the aerial vehicle may include electric contacts disposed on one or more legs of the aerial vehicle. Electric contact 738 makes contact with one of a plurality of negative nodes 628, while electric contact 740 makes contact with one of a plurality of positive nodes 626. In the present example, the aerial vehicle and the landing pad may be configured to allow for one of four poses of the aerial vehicle relative to the landing pad (one for each side of the truncated square pyramid depicted in FIGS. 3C and 6D), and slight variations thereof. This set of four poses may be imposed mechanically, but may also be assisted with navigation by the aerial vehicle, where such navigation is based on communication between the aerial vehicle and the landing pad or based on visual indicia on the landing pad, or beacons associated with the landing pad.

In the present example, the aerial vehicle may be configured to land in a predetermined set of poses relative to the landing pad. For example, the aerial vehicle may be configured to navigate to a single pose relative to the landing pad. In other examples, the aerial vehicle and landing pad may be configured to cause a pose of the aerial vehicle such that the aerial vehicle can land in any of four general poses on the landing pad. In other configurations for landing pad, such as that where the landing pad is configured as a triangular truncated pyramid, the set of poses may include three poses that correspond to three sides of the landing terminal. Other configurations and sets of poses are possible as well.

Though the present example includes a positive nodes 626, negative nodes 628, and a non-conductive space 624 similar to those depicted in FIGS. 7A-D, it should be understood that the present example may not necessarily adhere to the same configurations described with regard to those Figures. For instance, the base case scenario described above with regard to FIG. 7A may not apply to the present example.

Figure 8:
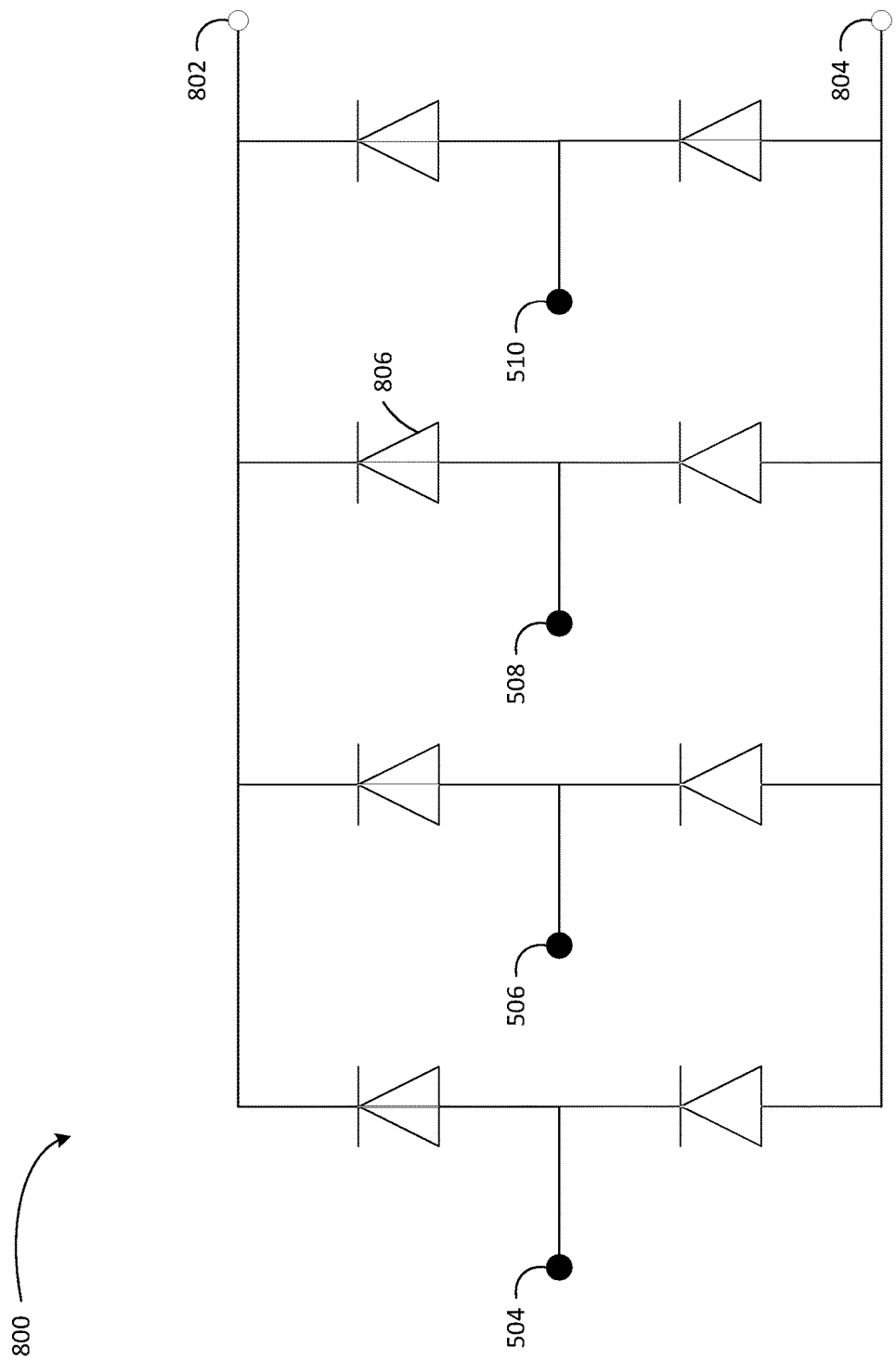
FIG. 8 is a simplified illustration of a rectifier, according to an example embodiment.

FIG. 8 depicts a rectifier 800 included within an aerial vehicle, according to an example embodiment. In the present example, rectifier 800 includes four pairs of diodes 806 that correspond to four electric contacts associated with a charging terminal of the aerial vehicle. In the present example, the diode pairs correspond to electric contacts 504, 506, 508, and 510 depicted in FIGS. 5A and 5B. However, it should be understood that rectifier 800 may include additional diodes where the landing terminal includes additional electric contacts. Rectifier 800 additionally includes a positive output node 802 and a negative output node 804. The diodes in rectifier 800 may include general purpose power diodes, Schottky diodes, of field effect transistors (FETs) operated as ideal diodes. Other types of semiconductive elements are possible as well.

In an example scenario, electric contacts 504 and 506 may contact one or more positive nodes of a landing terminal, electric contact 508 may contact a non-conductive space disposed between nodes of the landing terminal, and electric contact 510 may contact a negative node of the landing terminal. In the example scenario, pairs of diodes 806 associated with electric contacts 504 and 506 may contribute to the positive output at output node 802, while a pair of diodes associated with electric contact 510 may contribute to a negative output at output node 804.

FIG. 8 depicts a bridge rectifier configured to output a direct current (DC) power signal for consumption by a power sink included within the aerial vehicle. Circuit elements may be disposed between rectifier 800 and the power sink. Additional intervening elements are described below with regard to FIG. 10.

Figure 9:
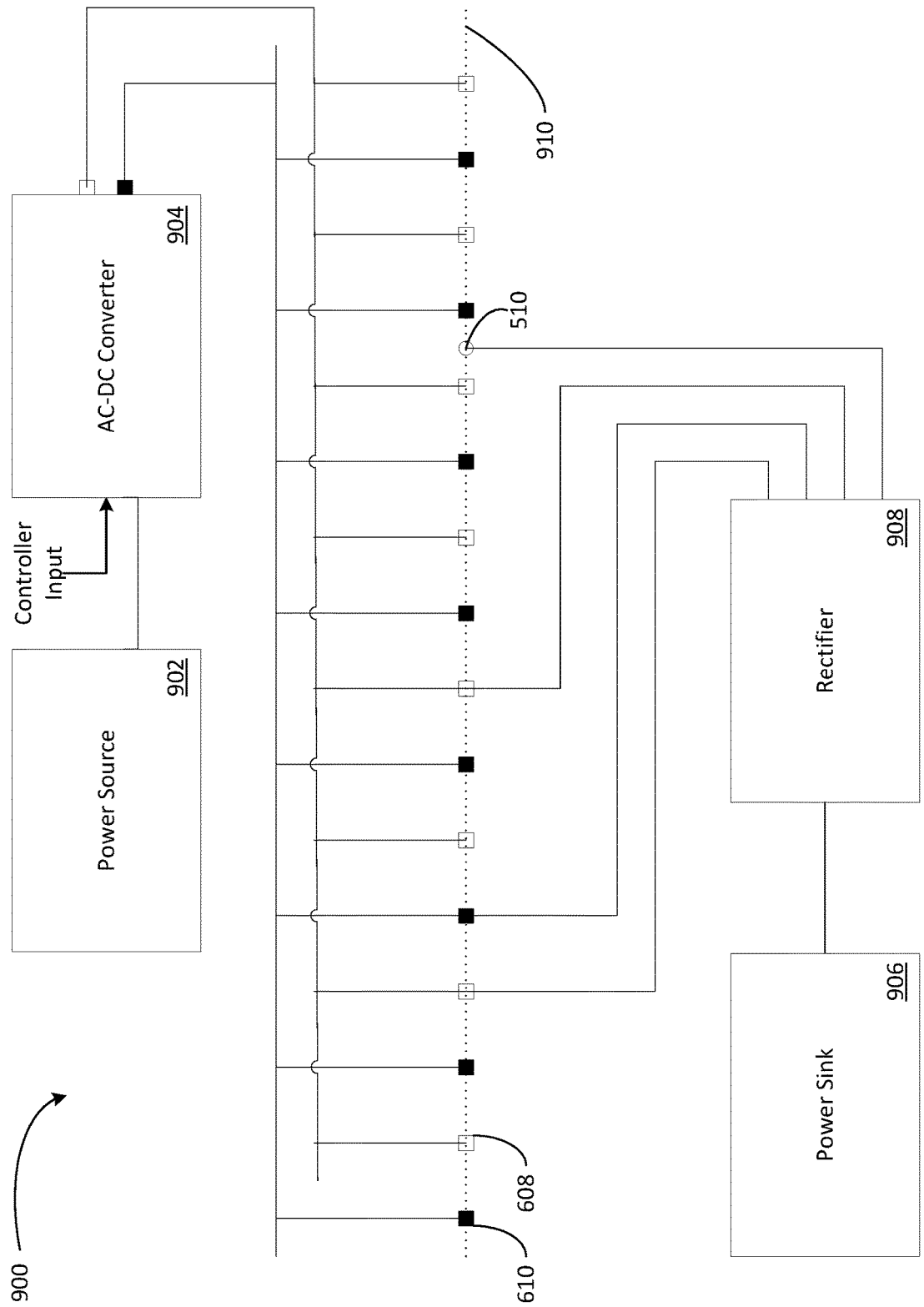
FIG. 9 is a simplified block diagram of a circuit, according to an example embodiment.

FIG. 9 depicts simplified diagram of a circuit 900, according to an example embodiment. In the present example, the circuit includes a power source 902, an AC-DC converter 904, a plurality of positive nodes 608 and negative nodes 610, a rectifier 908, and a power sink 906. These components may be shared among an aerial vehicle and a landing pad, as described above. In the present example, the plurality of nodes is disposed on a surface 910. The surface may be an outer surface of landing terminal of a landing pad. Several of the nodes may be open. That is, the nodes may be charged, but may not contact another element of the circuit. Other nodes of the plurality of nodes may be in contact with electric contacts of an aerial vehicle. These nodes and contacts may close the circuit such that electric power is transferred from power source 902 to power sink 906.

In some examples, the circuit may remain open when the aerial vehicle is in a non-landing state. That is, when the aerial vehicle is flying, and has not contacted a surface of the landing terminal, the nodes will all be open, and thus no electric power will be transferred.

At different poses of the aerial vehicle, different electric contacts may contact different nodes. Additionally, in some examples, certain electric contacts may not contact any node. In the present example, contact 510 does not contact any nodes, as such. As such, this contact may also be referred to as open. As described above with regard to FIG. 7A, node 510 may contact a gap between nodes. Electric leads may transfer electric power received by the electric contacts to rectifier 908, which, in turn, may transfer the electric power to power sink 906.

In the present example, the circuit includes an AC-DC converter 904. As such, in the present example the nodes transfer direct current to the electric contacts. However, in other examples the circuit may not include an AC-DC converter, or the AC-DC converter may receive control signals from a controller that cause it to output an alternating current signal received from the power source. In such examples, rectifier 908 may receive an alternating current signal for consumption by power sink 906. Such an output may be direct current or alternating current based on context. For instance, a controller may determine whether the landing terminal should output a direct current or alternating current signal based on a type of aerial vehicle that is landing on the landing pad. As described above with regard to FIGS. 6A and 6B, the landing pad may be configured to convey either a direct current or alternating current power signal to an aerial vehicle via a first set of nodes and a second set of nodes having an average voltage difference therebetween that is greater than zero.

In the present example, the AC-DC converter 904 outputs electric power based on a controller input. Circuit 900 may include one or more controllers that control a power output by the landing pad, and power received by the aerial vehicle. For instance, the one or more controllers may control any or all of a voltage output, current output, or power output by the landing terminal. The one or more controllers may include one or more processors configured to execute instructions stored on a computer readable medium, such as a non-transitory computer readable medium. The controllers may determine control signals for circuit 900 based on sensors inputs received at the landing pad and at the aerial vehicle. In some examples, a controller associated with the landing pad may base control signals on information received from the aerial vehicle. For instance, a controller associated with the landing pad may determine a power output based on a type of aerial vehicle that is approaching the landing pad. In this example, the aerial vehicle may communicate an identifier to the landing pad that the controller associates with a vehicle type and a corresponding power output for consumption by the aerial vehicle. Likewise, a controller associated with the aerial vehicle may base control signals on information received from the landing pad. For instance, the landing pad may communicate temperature or moisture information to the aerial vehicle, and the controller associated with the aerial vehicle may determine control signals that control a power uptake of the aerial vehicle based on the information. In one example, a landing pad may sense that the electrically conductive terminal is wet. In response, the aerial vehicle may stop a power uptake until the landing terminal is dry. Other communication between the landing pad and aerial vehicle is possible as well.

Figure 10:
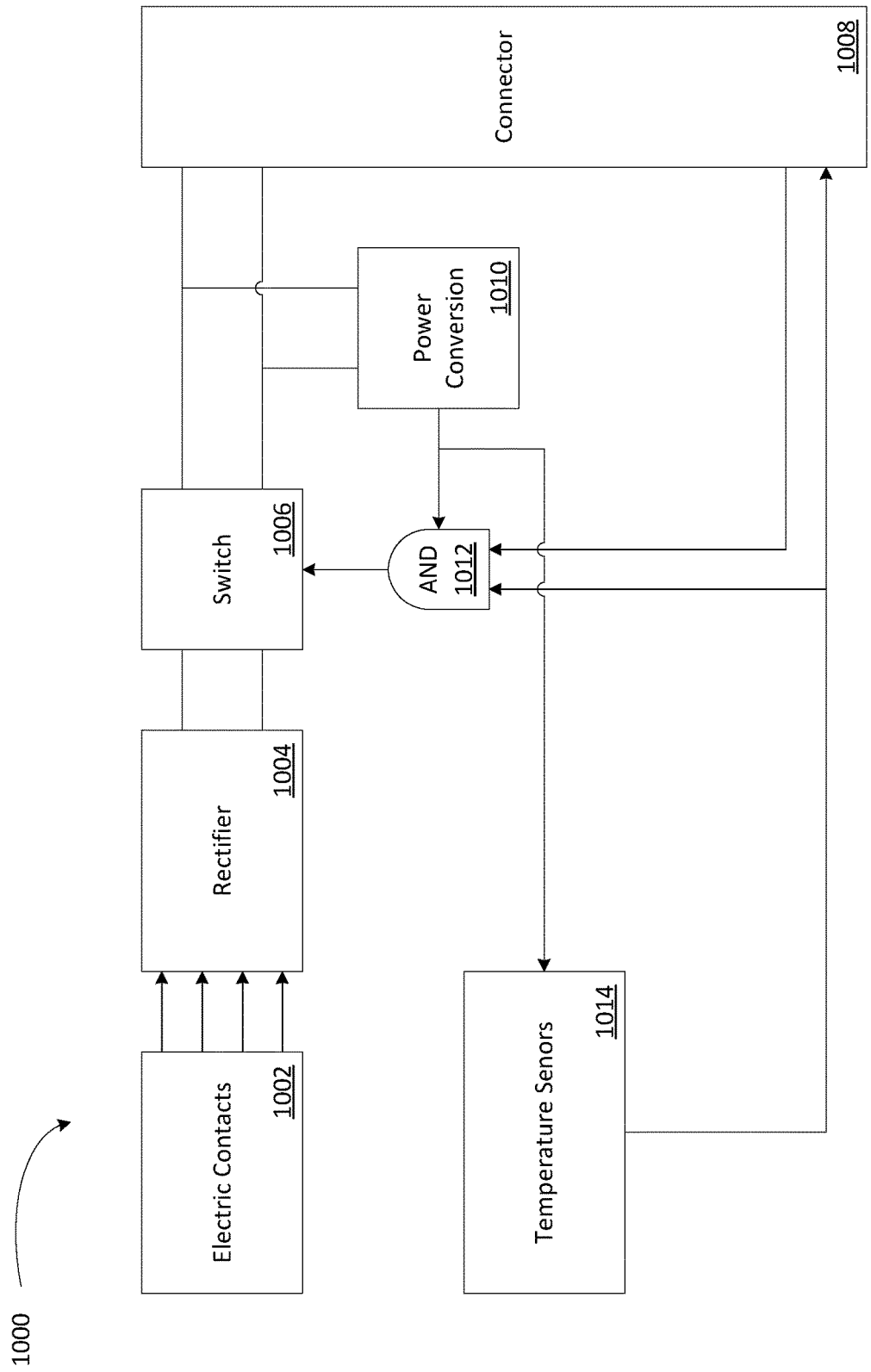
FIG. 10 is a simplified block diagram of a charging system within an aerial vehicle, according to an example embodiment.

FIG. 10 is a block diagram of power reception system 1000 at an aerial vehicle. System 1000 includes electric contacts 1002, rectifier 1004, switching module 1006, power conversion module 1010, temperature sensors 1014, connector 1008, and AND gate 1012. As described above, electric contacts 1002 and rectifier 1004 may convey a power signal for consumption by a power sink included within the aerial vehicle. The aerial vehicle may further include switching module 1006, which may disrupt the power signal from rectifier 1004. For instance, a controller may send control signals to switching module 1006 that cause the switch to vary a duty cycle that is sent to connector 1008 and power conversion module 1010. Power conversion module 1010 may include a controller that powers various components of the aerial vehicle during a landing state, including various sensors, actuators, transceivers, processors, or the like included within the aerial vehicle. In the present example, power conversion module 1010 sends power to temperature sensors 1014 and to AND gate 1012. Temperature sensors 1014 send signals to AND gate 1012. Connector 1008 also sends signals to AND gate 2012. The signals may collectively form an input for switching module 1006. Switching module 1006 may base an On/Off state of the switch on the AND gate 1012 output.

Connector 1008 may receive a power output from switching module 1006. The power output may be transferred to the power sink. The aerial vehicle may monitor a power consumption associated with the power sink, and may communicate that information to the landing pad. For example, a transceiver associated with the aerial vehicle may communicate a charge level associated with a battery of the aerial vehicle to the landing pad. In other examples, a controller of the aerial vehicle may communication with the landing pad using load modulation. In other examples, a controller of the aerial vehicle may determine that the power sink is being charged, and, while the power sink is being charged, the controller may control connector 1008, power conversion module 1010, or other components of the aerial vehicle to draw power directly from the output of rectifier 1004 or switching module 1006. Other ways of controlling the aerial vehicle during a landing state of the aerial vehicle are possible as well.

Figure 11:
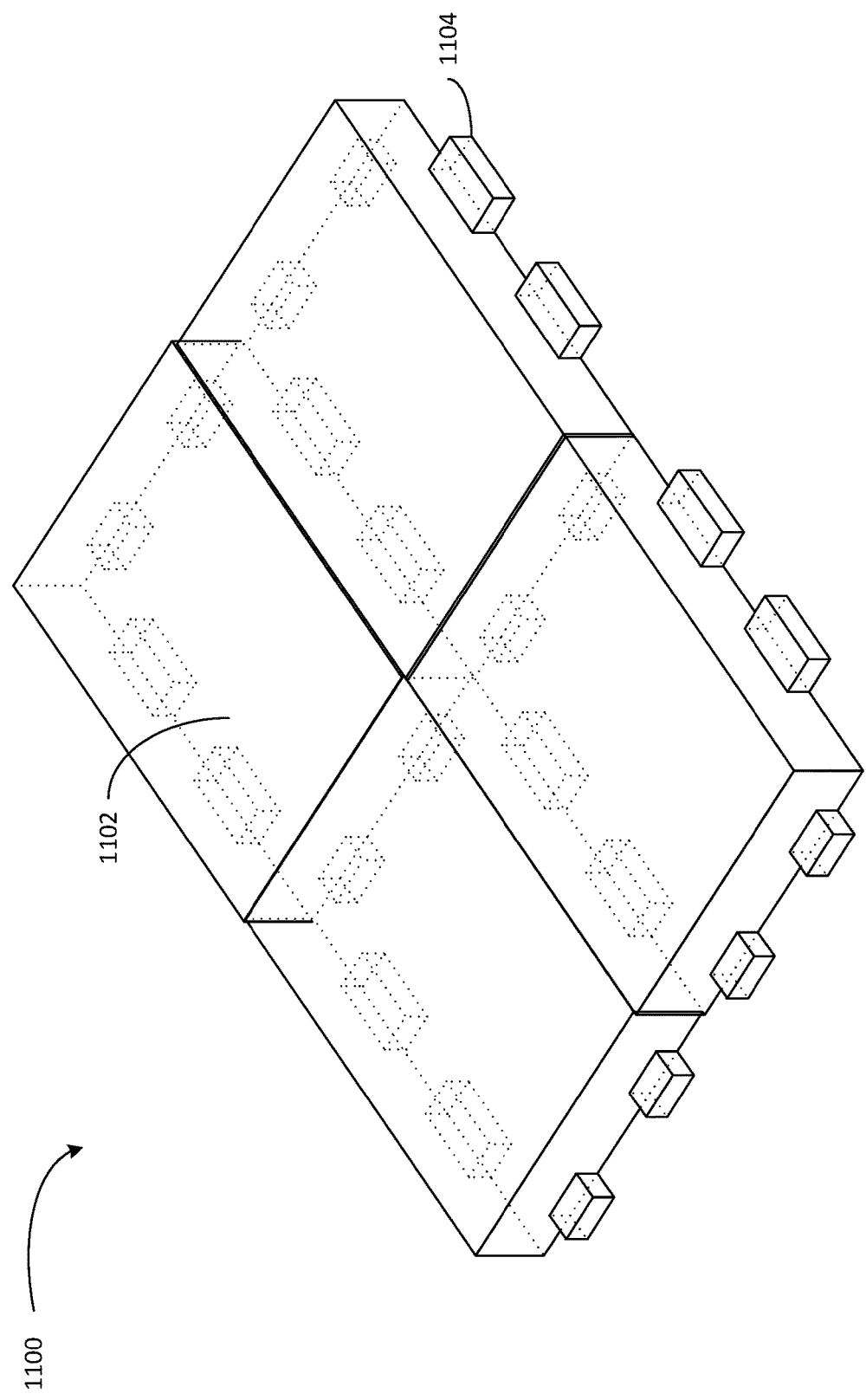
FIG. 11 is a simplified illustration of a landing pad formed from a plurality of tiles.

FIG. 11 depicts a plurality of modular tiled elements used to form a landing pad 1100, according to an example embodiment. In the present example, several tiles 1102 are connected via male/female connections among tabs 1104 of the tiles. Each tile of the plurality may be configured such that the tiles collectively form a landing terminal of landing pad 1100. For instance, the tiled elements 1102 may each include nodes arranged in parallel strips. When connected, the tiles 1102 may form a contiguous top surface that includes electrically conductive nodes separated by a non-conductive space that includes gaps, as described above with regard to FIG. 6A. The landing pad may include a housing that includes the tiled elements. The housing may additionally include a skirt and/or a lip disposed at an outer edge of the landing terminal.

Though, in the present example, the tiled elements 1102 are connected via tabs 1104, it should be understood that the tiled elements 1102 may be connected in other ways. For instance, the tiled elements 1102, may be connected via grooved connections or magnetic connections. In other examples, a housing of landing pad 1100, may compress edges of the tiled elements 1102 together. Other ways of merging or connecting the tiled elements are possible as well.

In some examples, each tiled element 1102 may be connected to a power source associated with landing pad 1100. However, in other examples, only one, or some, of the tiled elements 1102 may be connected to the power source, and the remaining tiled elements 1102 may receive electric power from other tiled elements of the plurality of tiled elements. Other ways of transferring electric power between electric elements 1102 are possible as well.

Figure 12:
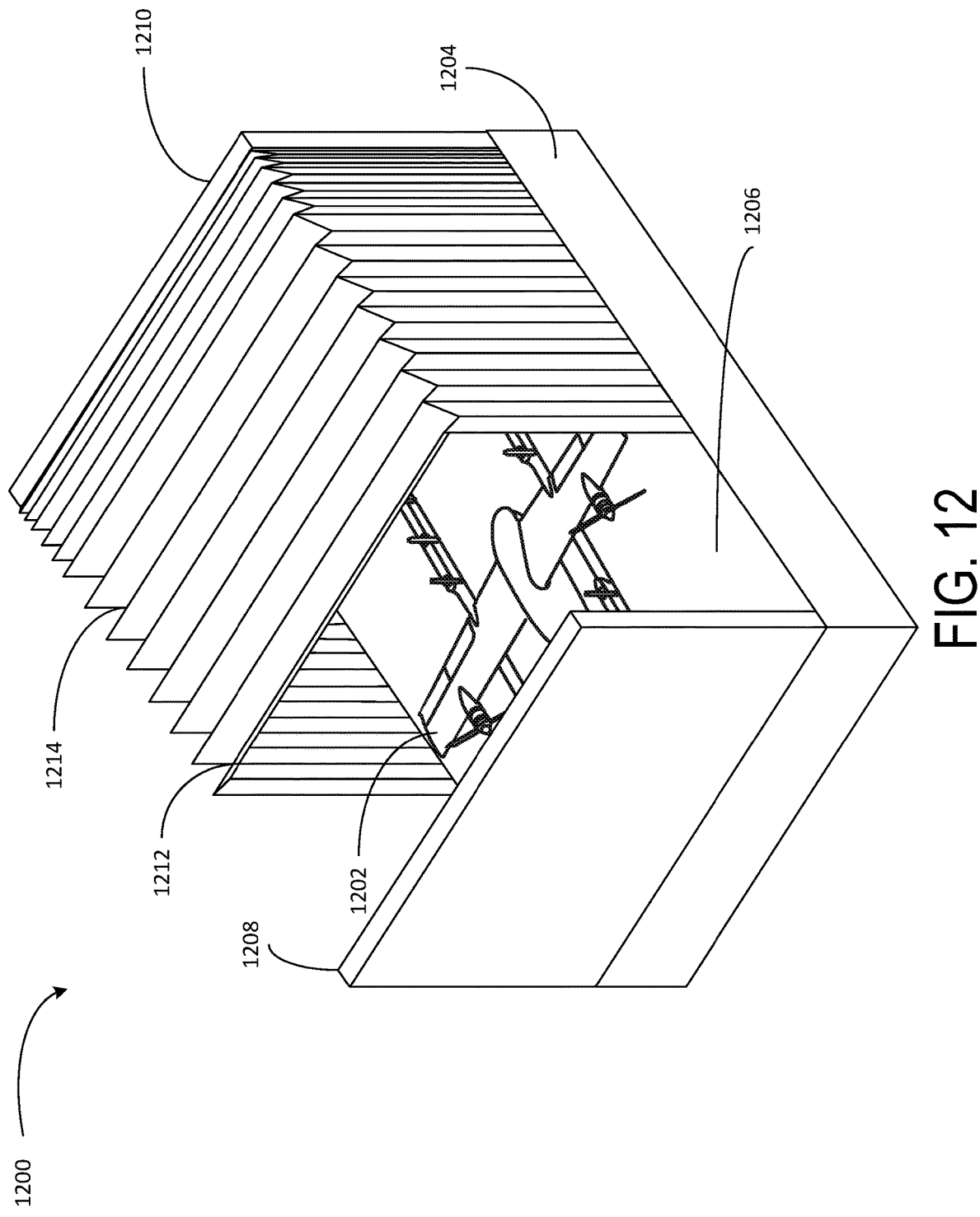
FIG. 12 is a simplified illustration of a landing pad having a retractable hood, according to an example embodiment.

FIG. 12 is a simplified illustration of a landing pad 1200, according to an example embodiment. In the present example, landing pad 1200 includes a housing 1204 that includes a landing terminal 1206, and a retractable hood 1214. Retractable hood 1214 is attached to housing 1204 at a first end 1210, and includes a closing edge 1212 configured to interact with a closing mechanism at a second end 1208 of housing 1204. While landing pad 1200 is empty, the retractable hood 1214 may remain closed at second end 1208. As an aerial vehicle, such as aerial vehicle 1202, approaches, the hood may detach from the closing mechanism and retract to allow the aerial vehicle to land on landing terminal 1206. Retractable hood 1214 may thereafter close again.

Landing pad 1200 may also include navigational aids, such as Quick Response Codes, machine-vision compatible fiducials, or structural light beacons, such as infrared or RF beacons. As described above with regard to FIG. 9, landing pad 1200 may additionally include a transceiver configured to communication with aerial vehicle 1202. Additionally, or alternatively, landing pad 1200 may include sensors that determine a proximity between the landing pad 1200 and aerial vehicle 1202, that cause an action to be performed. For example, when aerial vehicle 1202 is within a proximity threshold of the landing pad, retractable hood 1214 may retract.

In some embodiments, landing pad 1200 may additionally or alternatively include a retractable awning or shade, and/or a heating mechanism configured to evaporate accumulated moisture, frost, ice, snow, or the like. In addition, landing terminal 1206 may be slightly crowned or toiled to prevent standing water. Additional components may be included as well.

Though, in the present example, landing pad 1200 and retractable hood 1214 are depicted as housing a single aerial vehicle 1202, it should be understood that a single landing pad may simultaneously accept several aerial vehicles. For instance, a single landing pad and retractable hood may form a hangar configured to house a plurality of aerial vehicles.

V. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A landing pad for aerial vehicles comprising:
    a housing;
    a power terminal configured to draw electric power from a power source; and
    an electrically conductive landing terminal dorsal to the housing, the landing terminal comprising:
        a first set of nodes;
        a second set of nodes; and
        a non-conductive space disposed between the first set of nodes and the second set of nodes,
        wherein the first set of nodes, the second set of nodes, and the non-conductive space are configured such that, for any pose of an aerial vehicle during a landing state of the aerial vehicle on the landing pad, at least one electric contact of the charging terminal makes contact with a node of the first set of nodes, and at least one other electric contact of the charging terminal makes contact with a node of the second set of nodes.

2. The landing pad for aerial vehicles of claim 1, further comprising a controller, wherein the controller is configured to control an electric power output by the landing terminal for consumption by the power sink of the aerial vehicle.

3. The landing pad for aerial vehicles of claim 1, wherein an average voltage difference between the first set of nodes and the second set of nodes is greater than zero.

4. The landing pad for aerial vehicles of claim 3, wherein the landing terminal of the landing pad is configured to output a direct current power signal for consumption by the aerial vehicle, wherein the first set of nodes comprises a plurality of positive nodes having a first voltage, wherein the second set of nodes comprises a plurality of negative nodes having a second voltage, and wherein the average voltage difference between the first set of nodes and the second set of nodes is equal to the difference between the first voltage and the second voltage.

5. The landing pad for aerial vehicles of claim 1, wherein the housing of the landing pad comprises a plurality of modular tiled elements, and wherein the plurality of modular tiled elements collectively form the electrically conductive landing terminal.

6. The landing pad for aerial vehicles of claim 1, further comprising a lip disposed along an outer perimeter of the landing terminal.

7. The landing pad for aerial vehicles of claim 1, further comprising a retractable hood and a closing mechanism associated with the housing, wherein the retractable hood is configured to, prior to the landing state, retract from the closing mechanism, and, during the landing state, advance towards the closing mechanism.

8. The landing pad for aerial vehicles of claim 1, further comprising a heating element configured to control a temperature of the electrically conductive landing terminal.

9. A system comprising:
    an aerial vehicle, wherein the aerial vehicle comprises a fuselage, a power sink, and a charging terminal ventral to the fuselage, wherein the charging terminal comprises a plurality of electric contacts; and
    a landing pad, wherein the landing pad comprises a housing, and an electrically conductive landing terminal dorsal to the housing, the landing terminal comprising:
        a first set of nodes;
        a second set of nodes; and
        a non-conductive space disposed between the first set of nodes and the second set of nodes,
    wherein the first set of nodes, the second set of nodes, and the non-conductive space are configured such that, for any pose of the aerial vehicle during a landing state of the aerial vehicle on the landing pad, at least one electric contact of the charging terminal makes contact with a node of the first set of nodes, and at least one other electric contact of the charging terminal makes contact with a node of the second set of nodes.

10. The system of claim 9, wherein an average voltage difference between the first set of nodes and the second set of nodes is greater than zero.

11. The system of claim 10, wherein the electric contacts of the aerial vehicle and the nodes and non-conductive space of the landing pad are configured such that, regardless of a pose of the charging terminal of the aerial vehicle relative to the landing terminal of the landing pad during the landing state of the aerial vehicle, none of the electric contacts make contact with more than one node.

12. The system of claim 10, wherein the aerial vehicle and the landing pad are configured to cause a pose of the aerial vehicle relative to the landing pad during the landing state, and wherein the plurality of electric contacts comprise two or more electric contacts.

13. The system of claim 10, wherein the first set of nodes and the second set of nodes of the landing terminal are arranged in alternating strips, wherein the non-conductive space comprises a plurality of gaps disposed between the alternating strips, and wherein each of the plurality of gaps is wider than a diameter associated with the electric contacts.

14. The system of claim 13, wherein the plurality of electric contacts of the charging terminal comprise four or more electric contacts disposed within a radius of a point central to the plurality of electric contacts, and wherein the radius is wider than two-thirds the width of a given strip of the alternating strips plus four-thirds the width of a given gap of the plurality of gaps.

15. The system of claim 14, wherein the radius falls within a range of 0.75 to 1.0 times the width of the strip.

16. The system of claim 9, wherein the landing pad further comprises a controller, and wherein the controller is configured to control an amount of electric power output by the landing terminal for consumption by the power sink of the aerial vehicle.

17. The system of claim 9, wherein the wherein the housing of the landing pad comprises a plurality of modular tiled elements, and wherein the plurality of modular tiled elements collectively form the electrically conductive landing terminal.

18. An aerial vehicle comprising:
   a fuselage;
   a power sink;
   a charging terminal ventral to the fuselage, wherein the charging terminal comprises a plurality of electric contacts configured relative to a first set of nodes on a landing terminal of a landing pad and a second set of nodes on the landing terminal such that, for any pose of the aerial vehicle during a landing state of the aerial vehicle on the landing pad, at least one electric contact makes contact with a node of the first set of nodes, and at least one other electric contact makes contact with a node of the second set of nodes; and
   a plurality of electric leads configured to transfer the electric power drawn from the landing pad by the plurality of electric contacts to the power sink.

19. The aerial vehicle of claim 18, further comprising a landing module configured to support the fuselage during the landing state, wherein the charging terminal is comprised within the landing module, and wherein the electric contacts contribute to the support of the fuselage during the landing state.

20. The aerial vehicle of claim 19, wherein the electric contacts are disposed in a substantially planar fashion.

21. The aerial vehicle of claim 18, further comprising a rectifier disposed between the electric leads and the power sink, wherein the rectifier is configured to receive the electric power drawn by the electric contacts from the electric leads and to output a direct current power signal for consumption by the power sink.

22. The aerial vehicle of claim 18, wherein the plurality of electric contacts comprise four or more electric contacts disposed within a radius of a point central to the plurality of electric contacts.

23. The aerial vehicle of claim 18, wherein the aerial vehicle is configured to land at a predetermined set of poses relative to the landing pad, and wherein the plurality of electric contacts comprise two or more electric contacts.

24. The aerial vehicle of claim 18, wherein the charging terminal of the aerial vehicle further comprises a plurality of pressure-exerting elements connected to the electric contacts, wherein the plurality of pressure-exerting elements are configured to apply a downward force to each of the electric contacts during the landing state of the aerial vehicle.

25. The aerial vehicle of claim 18, wherein, during a non-landing state of the aerial vehicle, the electric contacts are disposed at a first position within an outer surface of the charging terminal, and wherein, during the landing state of the aerial vehicle, the electric contacts are disposed at a second position on or outside the outer surface of the charging terminal.

* * * * *